United States Patent
Krstic et al.

(10) Patent No.: US 10,277,120 B1
(45) Date of Patent: Apr. 30, 2019

(54) OPTIMIZED, MULTIPHASE SWITCHED-CAPACITOR DC-DC CONVERTER WITH VARIABLE GAIN

(71) Applicants: Marko Krstic, Kingston (CA); Praveen Jain, Kingston (CA)

(72) Inventors: Marko Krstic, Kingston (CA); Praveen Jain, Kingston (CA)

(*) Notice: Subject to any disclaimer, the term of this patent is extended or adjusted under 35 U.S.C. 154(b) by 0 days.

(21) Appl. No.: 15/874,760

(22) Filed: Jan. 18, 2018

(51) Int. Cl.
 *H02M 3/07* (2006.01)

(52) U.S. Cl.
 CPC ........ *H02M 3/07* (2013.01); *H02M 2003/072* (2013.01)

(58) Field of Classification Search
 CPC ............. H02M 3/07; H02M 2003/071; H02M 2003/072; H02M 3/073; H02M 2003/075; H02M 2003/077; H02M 3/06
 See application file for complete search history.

(56) References Cited

U.S. PATENT DOCUMENTS

| | | | |
|---|---|---|---|
| 6,198,645 B1* | 3/2001 | Kotowski | H02M 3/07 307/110 |
| 9,362,818 B2* | 6/2016 | Gorisse | H02M 3/07 |

\* cited by examiner

*Primary Examiner* — Jung Kim

(57) ABSTRACT

A structure and method is provided for DC to DC conversion using switched-capacitors. The DC-DC converter uses an optimized configuration of capacitors and switches that maximize the number of attainable ideal conversion ratios for the given number of capacitors. A method is provided for controlling the converter, wherein the control circuitry generates a multiphase switching sequence which turns the switches on and off in a cyclical manner. Sample switching sequences are provided to generate a set of attainable ideal conversion ratios, for up to three floating capacitors. The converter is programmable, modular and capable of dynamically varying its ideal conversion gain. It can be used to both step-up and step-down the input voltage.

9 Claims, 20 Drawing Sheets

| P | N | | | |
|---|---|---|---|---|
|   | 1 | 2 | 3 | 4 |
| 2 |   | 3 | 5 | 8 |
| 3 | 2 |   | 7 | 13 |
| 4 |   | 4 | 8 | 15 |
| 5 |   |   |   | 16 |

| Conversion Ratio | Phase | Switches | | | | |
|---|---|---|---|---|---|---|
| | | A1 | B1 | C1 | D1 | E1 |
| 1/2 | 1 | 1 | 0 | 0 | 1 | 0 |
| | 2 | 0 | 0 | 1 | 0 | 1 |
| 1 | 1 | 1 | 0 | 0 | 0 | 1 |
| | 2 | 0 | 0 | 1 | 0 | 1 |
| 1 (alternative) | 1 | 1 | 0 | 0 | 1 | 0 |
| | 2 | 0 | 1 | 1 | 0 | 0 |
| 2 | 1 | 1 | 0 | 0 | 0 | 1 |
| | 2 | 0 | 1 | 1 | 0 | 0 |

| Conversion Ratio | Phase | Switches | | | | | | | | | | | |
|---|---|---|---|---|---|---|---|---|---|---|---|---|---|
| | | A1 | A2 | B1 | B2 | C1 | C2 | D1 | D2 | E1 | E2 | F1 | G1 |
| 1/4 | 1 | 0 | 0 | 0 | 0 | 0 | 1 | 0 | 0 | 0 | 1 | 0 | 0 |
| | 2 | 0 | 1 | 0 | 0 | 0 | 0 | 1 | 0 | 0 | 0 | 0 | 1 |
| | 3 | 0 | 0 | 0 | 0 | 0 | 0 | 0 | 1 | 1 | 0 | 1 | 0 |
| 1/3 | 1 | 0 | 0 | 0 | 0 | 0 | 0 | 1 | 0 | 0 | 1 | 1 | 0 |
| | 2 | 0 | 1 | 0 | 0 | 1 | 0 | 0 | 0 | 1 | 0 | 0 | 1 |
| 2/3 | 1 | 0 | 1 | 0 | 0 | 0 | 0 | 1 | 0 | 0 | 0 | 0 | 1 |
| | 2 | 0 | 0 | 0 | 1 | 1 | 1 | 0 | 0 | 1 | 0 | 0 | 0 |
| 3/4 | 1 | 0 | 1 | 0 | 0 | 0 | 0 | 0 | 1 | 0 | 0 | 0 | 0 |
| | 2 | 0 | 0 | 0 | 0 | 0 | 0 | 1 | 0 | 0 | 1 | 1 | 0 |
| | 3 | 0 | 0 | 1 | 0 | 0 | 1 | 0 | 0 | 0 | 0 | 0 | 1 |
| 4/3 | 1 | 0 | 1 | 0 | 0 | 0 | 0 | 1 | 0 | 0 | 0 | 0 | 1 |
| | 2 | 0 | 0 | 0 | 1 | 0 | 0 | 0 | 0 | 1 | 0 | 1 | 0 |
| | 3 | 0 | 0 | 1 | 0 | 1 | 0 | 0 | 0 | 0 | 0 | 0 | 0 |
| 3/2 | 1 | 0 | 0 | 1 | 0 | 0 | 0 | 0 | 1 | 0 | 0 | 1 | 0 |
| | 2 | 1 | 0 | 0 | 0 | 0 | 1 | 0 | 0 | 1 | 0 | 0 | 1 |
| 3 | 1 | 0 | 1 | 0 | 0 | 0 | 0 | 0 | 0 | 1 | 1 | 1 | 0 |
| | 2 | 0 | 0 | 1 | 0 | 0 | 1 | 0 | 0 | 0 | 0 | 0 | 1 |
| 4 | 1 | 0 | 0 | 1 | 0 | 0 | 1 | 0 | 0 | 0 | 0 | 0 | 1 |
| | 2 | 0 | 0 | 1 | 0 | 0 | 0 | 0 | 0 | 0 | 1 | 1 | 0 |
| | 3 | 1 | 0 | 0 | 0 | 0 | 0 | 0 | 0 | 1 | 0 | 0 | 0 |

FIG. 11

| Conversion Ratio | Phase | A1 | A2 | A3 | B1 | B2 | B3 | C1 | C2 | C3 | D1 | D2 | D3 | E1 | E2 | E3 | F1 | F2 | G1 | G2 |
|---|---|---|---|---|---|---|---|---|---|---|---|---|---|---|---|---|---|---|---|---|
| 1/8 | 1 | 0 | 0 | 0 | 0 | 0 | 0 | 0 | 0 | 0 | 1 | 0 | 0 | 0 | 0 | 1 | 0 | 1 | 1 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 0 | 0 | 0 | 0 | 0 | 0 | 1 | 0 | 0 | 0 | 1 | 0 | 1 | 0 | 0 | 0 |
|  | 4 | 0 | 0 | 0 | 0 | 0 | 0 | 1 | 0 | 0 | 0 | 0 | 0 | 1 | 0 | 0 | 0 | 0 | 0 | 0 |
| 1/7 | 1 | 0 | 0 | 0 | 0 | 0 | 0 | 0 | 0 | 0 | 1 | 0 | 0 | 0 | 0 | 1 | 0 | 1 | 1 | 0 |
|  | 2 | 0 | 0 | 0 | 0 | 0 | 0 | 0 | 0 | 0 | 1 | 0 | 0 | 0 | 1 | 0 | 1 | 0 | 0 | 0 |
|  | 3 | 0 | 0 | 1 | 0 | 0 | 0 | 1 | 0 | 0 | 0 | 0 | 0 | 1 | 0 | 0 | 0 | 0 | 1 | 1 |
| 1/6 | 1 | 0 | 0 | 0 | 0 | 0 | 0 | 0 | 0 | 0 | 1 | 0 | 0 | 0 | 1 | 0 | 1 | 0 | 0 | 0 |
|  | 2 | 0 | 0 | 1 | 0 | 0 | 0 | 0 | 0 | 0 | 0 | 1 | 0 | 1 | 0 | 0 | 0 | 0 | 1 | 1 |
|  | 3 | 0 | 0 | 0 | 0 | 0 | 0 | 1 | 0 | 0 | 0 | 1 | 0 | 1 | 0 | 1 | 0 | 1 | 0 | 0 |
| 1/5 | 1 | 0 | 1 | 0 | 0 | 0 | 0 | 0 | 0 | 1 | 1 | 0 | 0 | 0 | 0 | 1 | 0 | 0 | 1 | 0 |
|  | 2 | 0 | 0 | 0 | 0 | 0 | 0 | 0 | 0 | 0 | 0 | 0 | 1 | 1 | 1 | 0 | 1 | 1 | 0 | 0 |
| 2/7 | 1 | 0 | 0 | 0 | 0 | 0 | 0 | 0 | 0 | 0 | 0 | 0 | 1 | 0 | 1 | 0 | 0 | 1 | 0 | 0 |
|  | 2 | 0 | 0 | 0 | 0 | 0 | 0 | 0 | 0 | 0 | 1 | 0 | 0 | 0 | 0 | 1 | 0 | 1 | 1 | 0 |
|  | 3 | 0 | 0 | 0 | 1 | 0 | 0 | 0 | 0 | 1 | 0 | 1 | 0 | 0 | 0 | 0 | 1 | 0 | 0 | 1 |
| 3/8 | 1 | 0 | 0 | 0 | 0 | 0 | 0 | 0 | 0 | 0 | 1 | 0 | 0 | 0 | 0 | 1 | 0 | 1 | 1 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 0 | 1 | 0 | 0 | 0 | 0 | 1 | 0 | 0 | 0 | 0 | 1 | 0 | 0 | 0 | 0 |
|  | 4 | 0 | 0 | 0 | 0 | 0 | 0 | 1 | 0 | 0 | 0 | 0 | 1 | 0 | 0 | 0 | 0 | 0 | 0 | 0 |
| 2/5 | 1 | 0 | 0 | 0 | 0 | 0 | 1 | 0 | 0 | 0 | 1 | 0 | 0 | 0 | 1 | 0 | 1 | 1 | 0 | 0 |
|  | 2 | 0 | 0 | 1 | 0 | 0 | 0 | 1 | 0 | 0 | 0 | 1 | 0 | 1 | 0 | 0 | 0 | 0 | 0 | 1 |
| 3/7 | 1 | 0 | 0 | 0 | 0 | 0 | 0 | 0 | 0 | 0 | 1 | 0 | 0 | 0 | 1 | 0 | 1 | 0 | 0 | 0 |
|  | 2 | 0 | 0 | 1 | 0 | 0 | 0 | 0 | 0 | 0 | 1 | 0 | 1 | 0 | 1 | 0 | 1 | 0 | 0 | 0 |
|  | 3 | 0 | 0 | 0 | 0 | 0 | 0 | 0 | 0 | 1 | 0 | 0 | 0 | 1 | 0 | 0 | 0 | 0 | 1 | 1 |
| 4/7 | 1 | 0 | 0 | 0 | 0 | 0 | 1 | 0 | 0 | 0 | 1 | 0 | 0 | 0 | 0 | 0 | 0 | 1 | 1 | 0 |
|  | 2 | 0 | 0 | 1 | 0 | 0 | 0 | 0 | 0 | 0 | 1 | 1 | 0 | 0 | 0 | 0 | 1 | 0 | 0 | 1 |
|  | 3 | 0 | 0 | 0 | 0 | 0 | 0 | 0 | 0 | 1 | 0 | 0 | 0 | 1 | 0 | 0 | 0 | 0 | 1 | 0 |
| 3/5 | 1 | 0 | 0 | 1 | 0 | 0 | 0 | 0 | 0 | 0 | 1 | 1 | 0 | 0 | 0 | 0 | 1 | 0 | 0 | 1 |
|  | 2 | 0 | 0 | 0 | 1 | 0 | 0 | 0 | 0 | 1 | 0 | 0 | 0 | 0 | 0 | 1 | 0 | 1 | 1 | 0 |
| 5/8 | 1 | 0 | 0 | 0 | 0 | 0 | 1 | 0 | 0 | 0 | 0 | 1 | 0 | 0 | 0 | 0 | 0 | 1 | 0 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 0 | 1 | 0 | 0 | 0 | 0 | 1 | 0 | 0 | 0 | 0 | 0 | 1 | 0 | 0 | 0 |
|  | 4 | 0 | 0 | 0 | 0 | 0 | 0 | 0 | 1 | 0 | 0 | 0 | 1 | 0 | 0 | 0 | 0 | 1 | 0 | 0 |
| 5/7 | 1 | 0 | 0 | 0 | 0 | 0 | 0 | 0 | 0 | 0 | 0 | 1 | 0 | 0 | 0 | 1 | 0 | 1 | 0 | 0 |
|  | 2 | 0 | 0 | 1 | 0 | 1 | 0 | 0 | 0 | 0 | 1 | 0 | 1 | 0 | 0 | 0 | 1 | 0 | 0 | 0 |
|  | 3 | 0 | 0 | 0 | 1 | 0 | 0 | 0 | 0 | 1 | 0 | 0 | 0 | 0 | 0 | 0 | 0 | 0 | 1 | 1 |
| 4/5 | 1 | 0 | 0 | 1 | 0 | 0 | 0 | 0 | 0 | 0 | 1 | 0 | 0 | 0 | 1 | 0 | 1 | 0 | 0 | 1 |
|  | 2 | 0 | 0 | 0 | 1 | 0 | 1 | 1 | 0 | 0 | 0 | 0 | 0 | 0 | 0 | 0 | 0 | 1 | 1 | 0 |
| 5/6 | 1 | 0 | 0 | 0 | 0 | 0 | 0 | 0 | 0 | 0 | 1 | 0 | 0 | 0 | 1 | 0 | 1 | 1 | 0 | 0 |
|  | 2 | 0 | 0 | 1 | 0 | 0 | 0 | 0 | 0 | 0 | 1 | 0 | 0 | 0 | 1 | 0 | 1 | 0 | 0 | 1 |
|  | 3 | 0 | 0 | 0 | 1 | 0 | 0 | 0 | 1 | 0 | 0 | 0 | 0 | 0 | 0 | 0 | 0 | 0 | 1 | 0 |
| 6/7 | 1 | 0 | 0 | 0 | 0 | 1 | 0 | 0 | 0 | 0 | 0 | 0 | 1 | 0 | 0 | 0 | 0 | 1 | 1 | 0 |
|  | 2 | 0 | 0 | 0 | 1 | 0 | 0 | 0 | 0 | 0 | 0 | 1 | 0 | 0 | 0 | 0 | 1 | 0 | 0 | 0 |
|  | 3 | 1 | 0 | 0 | 0 | 0 | 0 | 0 | 1 | 1 | 0 | 0 | 0 | 1 | 0 | 0 | 0 | 0 | 0 | 1 |
| 7/8 | 1 | 0 | 0 | 0 | 0 | 0 | 0 | 0 | 0 | 0 | 1 | 0 | 0 | 0 | 0 | 1 | 0 | 1 | 1 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 0 | 1 | 0 | 0 | 0 | 0 | 1 | 0 | 0 | 0 | 0 | 0 | 1 | 0 | 0 | 0 |
|  | 4 | 0 | 0 | 0 | 1 | 0 | 0 | 1 | 0 | 0 | 0 | 0 | 0 | 0 | 0 | 0 | 0 | 0 | 0 | 0 |

FIG. 13A

| Conversion Ratio | Phase | Switches | | | | | | | | | | | | | | | | | |
|---|---|---|---|---|---|---|---|---|---|---|---|---|---|---|---|---|---|---|
| | | A1 | A2 | A3 | B1 | B2 | B3 | C1 | C2 | C3 | D1 | D2 | D3 | E1 | E2 | E3 | F1 | F2 | G1 | G2 |
| 8/7 | 1 | 0 | 0 | 0 | 0 | 1 | 0 | 0 | 0 | 1 | 0 | 0 | 0 | 0 | 0 | 0 | 0 | 0 | 1 |
| | 2 | 0 | 1 | 0 | 0 | 0 | 0 | 0 | 0 | 0 | 1 | 0 | 0 | 0 | 0 | 0 | 0 | 1 | 0 |
| | 3 | 0 | 0 | 0 | 1 | 0 | 0 | 0 | 0 | 0 | 0 | 0 | 1 | 0 | 0 | 0 | 1 | 1 | 0 |
| | 4 | 0 | 0 | 0 | 1 | 0 | 0 | 0 | 0 | 0 | 0 | 0 | 0 | 1 | 0 | 1 | 0 | 0 | 0 |
| 7/6 | 1 | 0 | 0 | 0 | 1 | 0 | 0 | 0 | 0 | 0 | 0 | 0 | 0 | 0 | 1 | 0 | 1 | 1 | 0 |
| | 2 | 0 | 0 | 0 | 1 | 0 | 0 | 0 | 0 | 0 | 0 | 1 | 0 | 0 | 0 | 1 | 0 | 0 | 0 |
| | 3 | 1 | 0 | 0 | 0 | 0 | 0 | 0 | 0 | 1 | 1 | 0 | 0 | 0 | 0 | 0 | 0 | 1 | 1 |
| 6/5 | 1 | 0 | 0 | 1 | 0 | 0 | 0 | 0 | 0 | 0 | 0 | 1 | 0 | 0 | 0 | 0 | 0 | 0 | 1 |
| | 2 | 0 | 0 | 0 | 0 | 1 | 1 | 0 | 0 | 1 | 0 | 0 | 0 | 1 | 0 | 0 | 1 | 0 | 0 |
| | 3 | 0 | 0 | 0 | 1 | 0 | 0 | 0 | 1 | 0 | 0 | 0 | 0 | 0 | 0 | 0 | 0 | 1 | 0 |
| 5/4 | 1 | 0 | 1 | 0 | 0 | 0 | 0 | 0 | 0 | 0 | 0 | 1 | 1 | 0 | 0 | 0 | 1 | 1 | 0 |
| | 2 | 0 | 0 | 0 | 1 | 1 | 0 | 0 | 0 | 1 | 0 | 0 | 0 | 0 | 0 | 1 | 0 | 0 | 1 |
| 7/5 | 1 | 0 | 1 | 0 | 0 | 0 | 0 | 0 | 0 | 0 | 1 | 0 | 0 | 0 | 0 | 0 | 0 | 1 | 0 |
| | 2 | 0 | 0 | 0 | 1 | 0 | 0 | 0 | 0 | 1 | 0 | 0 | 0 | 0 | 0 | 0 | 0 | 1 | 1 |
| | 3 | 0 | 0 | 0 | 1 | 1 | 0 | 0 | 0 | 0 | 0 | 0 | 0 | 0 | 1 | 1 | 1 | 0 | 0 |
| 8/5 | 1 | 0 | 0 | 0 | 0 | 0 | 1 | 0 | 0 | 0 | 1 | 0 | 0 | 0 | 0 | 0 | 1 | 0 | 0 |
| | 2 | 0 | 0 | 1 | 0 | 0 | 0 | 0 | 0 | 0 | 0 | 0 | 1 | 0 | 0 | 0 | 0 | 1 | 1 |
| | 3 | 0 | 0 | 0 | 0 | 0 | 0 | 0 | 0 | 0 | 1 | 0 | 1 | 0 | 0 | 1 | 0 | 0 | 0 |
| | 4 | 0 | 0 | 0 | 1 | 0 | 0 | 0 | 0 | 0 | 0 | 1 | 0 | 0 | 0 | 0 | 1 | 1 | 0 |
| 5/3 | 1 | 0 | 0 | 0 | 0 | 0 | 1 | 0 | 0 | 0 | 0 | 0 | 1 | 1 | 0 | 1 | 1 | 0 | 0 |
| | 2 | 0 | 0 | 1 | 1 | 0 | 0 | 0 | 1 | 0 | 0 | 1 | 0 | 0 | 0 | 0 | 0 | 1 | 0 |
| 7/4 | 1 | 0 | 0 | 0 | 0 | 1 | 0 | 0 | 0 | 1 | 0 | 0 | 0 | 0 | 0 | 0 | 0 | 0 | 1 |
| | 2 | 0 | 0 | 1 | 0 | 0 | 0 | 0 | 0 | 0 | 0 | 0 | 1 | 0 | 0 | 0 | 0 | 1 | 1 |
| | 3 | 0 | 0 | 0 | 1 | 0 | 0 | 0 | 0 | 0 | 1 | 0 | 0 | 0 | 1 | 1 | 1 | 0 | 0 |
| 7/3 | 1 | 0 | 0 | 0 | 0 | 1 | 0 | 0 | 0 | 1 | 0 | 0 | 0 | 0 | 0 | 0 | 0 | 0 | 1 |
| | 2 | 0 | 0 | 0 | 0 | 0 | 1 | 0 | 0 | 0 | 0 | 0 | 1 | 0 | 0 | 0 | 1 | 1 | 0 |
| | 3 | 0 | 0 | 1 | 1 | 0 | 0 | 0 | 0 | 0 | 0 | 1 | 0 | 0 | 0 | 1 | 1 | 0 | 0 | 0 |
| 5/2 | 1 | 0 | 1 | 1 | 0 | 0 | 0 | 0 | 0 | 0 | 0 | 0 | 1 | 0 | 1 | 0 | 0 | 1 | 0 |
| | 2 | 0 | 0 | 0 | 1 | 1 | 0 | 0 | 0 | 1 | 0 | 0 | 0 | 0 | 0 | 0 | 0 | 0 | 1 |
| 8/3 | 1 | 0 | 0 | 0 | 0 | 0 | 1 | 0 | 0 | 0 | 0 | 0 | 0 | 1 | 0 | 0 | 1 | 0 | 0 |
| | 2 | 0 | 0 | 1 | 0 | 0 | 0 | 0 | 0 | 0 | 0 | 0 | 1 | 0 | 0 | 0 | 0 | 1 | 1 |
| | 3 | 0 | 0 | 0 | 0 | 1 | 0 | 0 | 0 | 0 | 0 | 0 | 1 | 0 | 1 | 0 | 0 | 0 | 0 |
| | 4 | 0 | 0 | 0 | 1 | 0 | 0 | 0 | 1 | 0 | 0 | 0 | 0 | 0 | 0 | 0 | 0 | 1 | 0 |
| 7/2 | 1 | 0 | 0 | 0 | 0 | 1 | 0 | 0 | 0 | 0 | 0 | 0 | 0 | 0 | 1 | 0 | 1 | 0 | 0 |
| | 2 | 0 | 0 | 0 | 0 | 0 | 1 | 0 | 0 | 0 | 0 | 0 | 1 | 0 | 0 | 0 | 1 | 1 | 0 |
| | 3 | 0 | 0 | 0 | 1 | 0 | 0 | 0 | 1 | 0 | 1 | 0 | 0 | 0 | 1 | 0 | 0 | 0 | 1 |
| 5 | 1 | 0 | 0 | 0 | 0 | 0 | 1 | 0 | 0 | 0 | 0 | 0 | 1 | 1 | 0 | 1 | 1 | 0 | 0 |
| | 2 | 0 | 0 | 1 | 1 | 0 | 0 | 0 | 1 | 0 | 0 | 0 | 0 | 0 | 1 | 0 | 0 | 1 | 0 |
| 6 | 1 | 0 | 0 | 0 | 1 | 0 | 0 | 0 | 0 | 0 | 0 | 0 | 0 | 0 | 0 | 1 | 0 | 1 | 1 | 0 |
| | 2 | 0 | 0 | 0 | 1 | 0 | 0 | 0 | 0 | 0 | 0 | 0 | 1 | 0 | 1 | 0 | 0 | 0 | 0 |
| | 3 | 1 | 0 | 0 | 0 | 0 | 0 | 0 | 0 | 1 | 0 | 0 | 1 | 1 | 0 | 0 | 0 | 0 | 1 |
| 7 | 1 | 0 | 0 | 0 | 1 | 0 | 0 | 0 | 0 | 1 | 0 | 0 | 0 | 0 | 0 | 0 | 0 | 1 | 1 |
| | 2 | 0 | 0 | 0 | 1 | 0 | 0 | 0 | 0 | 0 | 0 | 0 | 0 | 1 | 0 | 1 | 0 | 0 | 0 |
| | 3 | 1 | 0 | 0 | 0 | 0 | 0 | 0 | 0 | 0 | 0 | 0 | 1 | 0 | 1 | 0 | 1 | 1 | 0 |
| 8 | 1 | 0 | 0 | 0 | 1 | 0 | 0 | 0 | 0 | 1 | 0 | 0 | 0 | 0 | 0 | 0 | 0 | 1 | 1 |
| | 2 | 0 | 0 | 0 | 1 | 0 | 0 | 0 | 0 | 0 | 0 | 0 | 0 | 1 | 0 | 1 | 1 | 1 | 0 |
| | 3 | 0 | 0 | 0 | 1 | 0 | 0 | 0 | 0 | 0 | 0 | 0 | 1 | 0 | 1 | 0 | 0 | 0 | 0 |
| | 4 | 1 | 0 | 0 | 0 | 0 | 0 | 0 | 0 | 0 | 0 | 0 | 1 | 0 | 0 | 0 | 0 | 0 | 0 |

FIG. 13B

| Conversion Ratio | Phase | Switches | | | | | | | | | | | |
|---|---|---|---|---|---|---|---|---|---|---|---|---|---|
| | | A1 | A2 | B1 | B2 | C1 | C2 | D1 | D2 | E1 | E2 | F1 | G1 |
| 1/4 | 1 | 0 | 0 | 0 | 0 | 0 | 0 | 1 | 0 | 0 | 1 | 1 | 0 |
| | 2 | 0 | 1 | 0 | 0 | 0 | 0 | 1 | 0 | 0 | 0 | 0 | 1 |
| | 3 | 0 | 0 | 0 | 0 | 1 | 0 | 0 | 0 | 1 | 0 | 0 | 0 |
| 1/3 | 1 | 0 | 0 | 0 | 0 | 0 | 1 | 1 | 0 | 0 | 1 | 0 | 1 |
| | 2 | 0 | 0 | 1 | 0 | 0 | 0 | 0 | 1 | 0 | 0 | 1 | 0 |
| 2/3 | 1 | 0 | 0 | 0 | 0 | 0 | 0 | 1 | 0 | 0 | 1 | 1 | 0 |
| | 2 | 0 | 1 | 1 | 0 | 1 | 0 | 0 | 0 | 0 | 0 | 0 | 1 |
| 3/4 | 1 | 0 | 0 | 0 | 0 | 0 | 0 | 0 | 1 | 1 | 0 | 1 | 0 |
| | 2 | 0 | 0 | 1 | 0 | 0 | 1 | 0 | 0 | 0 | 0 | 0 | 1 |
| | 3 | 1 | 0 | 0 | 0 | 0 | 0 | 1 | 0 | 0 | 0 | 0 | 0 |
| 4/3 | 1 | 0 | 0 | 0 | 1 | 0 | 0 | 1 | 0 | 0 | 0 | 1 | 0 |
| | 2 | 0 | 1 | 0 | 0 | 0 | 0 | 0 | 0 | 1 | 0 | 0 | 1 |
| | 3 | 0 | 0 | 1 | 0 | 1 | 0 | 0 | 0 | 0 | 0 | 0 | 0 |
| 3/2 | 1 | 0 | 0 | 0 | 1 | 0 | 0 | 0 | 0 | 1 | 0 | 1 | 0 |
| | 2 | 0 | 1 | 1 | 0 | 1 | 0 | 0 | 1 | 0 | 0 | 0 | 0 |
| 3 | 1 | 0 | 0 | 1 | 0 | 0 | 0 | 0 | 0 | 0 | 1 | 1 | 0 |
| | 2 | 1 | 0 | 0 | 0 | 0 | 1 | 0 | 0 | 1 | 0 | 0 | 1 |
| 4 | 1 | 0 | 1 | 0 | 0 | 0 | 0 | 0 | 0 | 0 | 1 | 0 | 0 |
| | 2 | 0 | 0 | 0 | 1 | 0 | 0 | 0 | 0 | 1 | 0 | 1 | 0 |
| | 3 | 0 | 0 | 1 | 0 | 0 | 1 | 0 | 0 | 0 | 0 | 0 | 1 |

FIG. 14

| Conversion Ratio | Phase | A1 | A2 | A3 | B1 | B2 | B3 | C1 | C2 | C3 | D1 | D2 | D3 | E1 | E2 | E3 | F1 | F2 | G1 | G2 |
|---|---|---|---|---|---|---|---|---|---|---|---|---|---|---|---|---|---|---|---|---|
| 1/8 | 1 | 0 | 0 | 0 | 0 | 0 | 0 | 0 | 0 | 0 | 0 | 1 | 0 | 0 | 0 | 1 | 0 | 1 | 0 | 0 |
|  | 2 | 0 | 0 | 0 | 0 | 1 | 0 | 0 | 0 | 0 | 1 | 0 | 0 | 0 | 0 | 0 | 1 | 0 | 0 | 0 |
|  | 3 | 0 | 0 | 0 | 0 | 0 | 0 | 0 | 0 | 0 | 0 | 0 | 1 | 1 | 0 | 0 | 0 | 1 | 1 | 0 |
|  | 4 | 0 | 0 | 0 | 1 | 0 | 0 | 0 | 0 | 1 | 0 | 0 | 0 | 0 | 0 | 0 | 0 | 0 | 1 | 1 |
| 1/7 | 1 | 0 | 0 | 1 | 0 | 0 | 0 | 0 | 0 | 0 | 1 | 0 | 0 | 0 | 0 | 0 | 0 | 0 | 1 | 1 |
|  | 2 | 0 | 0 | 0 | 0 | 0 | 0 | 0 | 0 | 0 | 1 | 0 | 0 | 0 | 1 | 0 | 1 | 0 | 0 | 0 |
|  | 3 | 0 | 0 | 0 | 0 | 0 | 0 | 0 | 0 | 0 | 0 | 1 | 0 | 1 | 0 | 1 | 0 | 1 | 1 | 0 |
| 1/6 | 1 | 0 | 0 | 0 | 0 | 0 | 0 | 0 | 0 | 1 | 0 | 0 | 0 | 0 | 0 | 1 | 0 | 0 | 0 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 0 | 0 | 0 | 0 | 0 | 0 | 0 | 0 | 1 | 1 | 1 | 0 | 1 | 1 | 0 | 0 |
| 1/5 | 1 | 0 | 0 | 0 | 0 | 0 | 0 | 0 | 0 | 1 | 1 | 0 | 0 | 0 | 0 | 1 | 0 | 0 | 1 | 1 |
|  | 2 | 0 | 0 | 0 | 1 | 0 | 0 | 0 | 0 | 0 | 0 | 0 | 1 | 0 | 1 | 0 | 1 | 1 | 0 | 0 |
| 2/7 | 1 | 0 | 0 | 0 | 0 | 0 | 0 | 0 | 0 | 0 | 0 | 1 | 0 | 1 | 0 | 1 | 0 | 1 | 0 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 1 | 0 | 0 | 0 | 0 | 1 | 0 | 1 | 0 | 0 | 0 | 1 | 1 | 0 | 0 | 0 |
| 3/8 | 1 | 0 | 0 | 0 | 0 | 0 | 0 | 0 | 1 | 0 | 0 | 0 | 0 | 0 | 1 | 0 | 0 | 0 | 0 | 0 |
|  | 2 | 0 | 0 | 0 | 0 | 0 | 0 | 0 | 0 | 0 | 1 | 0 | 0 | 0 | 0 | 1 | 0 | 1 | 1 | 0 |
|  | 3 | 0 | 0 | 1 | 0 | 0 | 0 | 0 | 0 | 0 | 1 | 0 | 0 | 0 | 0 | 0 | 0 | 0 | 1 | 1 |
|  | 4 | 0 | 0 | 0 | 1 | 0 | 0 | 0 | 0 | 0 | 0 | 1 | 0 | 0 | 0 | 0 | 1 | 0 | 0 | 0 |
| 2/5 | 1 | 0 | 0 | 1 | 0 | 0 | 0 | 0 | 0 | 0 | 1 | 0 | 0 | 1 | 0 | 1 | 0 | 0 | 0 | 1 |
|  | 2 | 0 | 0 | 0 | 0 | 0 | 1 | 1 | 0 | 0 | 0 | 1 | 0 | 1 | 0 | 0 | 0 | 1 | 0 | 0 |
| 3/7 | 1 | 0 | 1 | 0 | 0 | 0 | 0 | 0 | 0 | 0 | 1 | 0 | 0 | 0 | 0 | 0 | 0 | 0 | 1 | 0 |
|  | 2 | 0 | 0 | 0 | 0 | 0 | 0 | 0 | 0 | 0 | 0 | 0 | 1 | 1 | 0 | 0 | 0 | 1 | 1 | 0 |
|  | 3 | 0 | 0 | 0 | 0 | 0 | 0 | 0 | 0 | 1 | 0 | 0 | 0 | 1 | 1 | 0 | 1 | 0 | 0 | 1 |
| 4/7 | 1 | 0 | 0 | 1 | 0 | 0 | 0 | 0 | 0 | 0 | 1 | 0 | 0 | 0 | 0 | 0 | 0 | 0 | 1 | 1 |
|  | 2 | 0 | 0 | 0 | 0 | 0 | 0 | 0 | 0 | 1 | 0 | 0 | 0 | 1 | 1 | 0 | 1 | 0 | 0 | 1 |
|  | 3 | 0 | 0 | 0 | 1 | 0 | 0 | 0 | 0 | 0 | 0 | 0 | 0 | 0 | 1 | 0 | 1 | 1 | 1 | 0 |
| 3/5 | 1 | 0 | 0 | 1 | 0 | 0 | 0 | 0 | 0 | 0 | 1 | 0 | 0 | 0 | 1 | 0 | 1 | 0 | 0 | 1 |
|  | 2 | 0 | 0 | 0 | 0 | 1 | 0 | 0 | 0 | 0 | 0 | 1 | 0 | 0 | 0 | 1 | 0 | 1 | 1 | 1 |
| 5/8 | 1 | 0 | 0 | 1 | 0 | 0 | 0 | 0 | 0 | 0 | 1 | 0 | 0 | 0 | 0 | 0 | 0 | 0 | 0 | 1 |
|  | 2 | 0 | 0 | 0 | 0 | 0 | 0 | 0 | 0 | 0 | 1 | 0 | 0 | 0 | 0 | 1 | 0 | 1 | 1 | 0 |
|  | 3 | 0 | 0 | 0 | 0 | 0 | 0 | 0 | 0 | 0 | 1 | 0 | 0 | 0 | 1 | 0 | 1 | 0 | 0 | 0 |
|  | 4 | 0 | 0 | 0 | 1 | 0 | 0 | 0 | 1 | 0 | 0 | 0 | 0 | 0 | 0 | 0 | 0 | 0 | 1 | 0 |
| 5/7 | 1 | 0 | 0 | 0 | 0 | 0 | 1 | 0 | 0 | 0 | 1 | 0 | 0 | 0 | 0 | 0 | 0 | 0 | 1 | 1 |
|  | 2 | 0 | 0 | 0 | 0 | 0 | 0 | 0 | 0 | 0 | 1 | 0 | 0 | 0 | 1 | 0 | 1 | 0 | 0 | 0 |
|  | 3 | 0 | 0 | 1 | 1 | 0 | 0 | 1 | 0 | 0 | 0 | 0 | 0 | 0 | 0 | 0 | 0 | 0 | 1 | 1 |
| 4/5 | 1 | 0 | 0 | 1 | 0 | 1 | 0 | 0 | 0 | 0 | 1 | 0 | 0 | 0 | 0 | 0 | 1 | 0 | 0 | 1 |
|  | 2 | 0 | 0 | 0 | 1 | 0 | 0 | 0 | 0 | 0 | 0 | 1 | 0 | 0 | 0 | 1 | 0 | 1 | 1 | 0 |
| 5/6 | 1 | 0 | 0 | 1 | 0 | 0 | 0 | 0 | 0 | 0 | 0 | 1 | 0 | 0 | 0 | 0 | 0 | 0 | 0 | 0 |
|  | 2 | 0 | 0 | 0 | 0 | 0 | 1 | 0 | 0 | 0 | 1 | 0 | 0 | 0 | 0 | 0 | 0 | 1 | 1 | 0 |
|  | 3 | 0 | 0 | 0 | 0 | 1 | 0 | 0 | 0 | 1 | 0 | 0 | 0 | 1 | 0 | 1 | 0 | 0 | 0 | 1 |
| 6/7 | 1 | 0 | 0 | 1 | 0 | 0 | 0 | 0 | 0 | 0 | 1 | 0 | 0 | 0 | 0 | 0 | 0 | 0 | 1 | 1 |
|  | 2 | 0 | 0 | 0 | 0 | 1 | 0 | 0 | 0 | 0 | 1 | 0 | 0 | 0 | 0 | 0 | 1 | 0 | 0 | 0 |
|  | 3 | 0 | 0 | 0 | 0 | 1 | 0 | 0 | 0 | 0 | 0 | 1 | 0 | 0 | 0 | 1 | 0 | 1 | 1 | 0 |
| 7/8 | 1 | 0 | 1 | 0 | 0 | 0 | 0 | 0 | 0 | 0 | 1 | 0 | 0 | 0 | 0 | 0 | 0 | 0 | 0 | 0 |
|  | 2 | 0 | 0 | 0 | 0 | 1 | 0 | 0 | 0 | 0 | 1 | 0 | 0 | 0 | 0 | 1 | 0 | 0 | 0 | 0 |
|  | 3 | 0 | 0 | 0 | 0 | 0 | 0 | 0 | 0 | 0 | 0 | 1 | 1 | 0 | 0 | 0 | 1 | 1 | 0 | 0 |
|  | 4 | 0 | 0 | 0 | 1 | 0 | 0 | 0 | 0 | 1 | 0 | 0 | 0 | 0 | 0 | 0 | 0 | 0 | 1 | 1 |

FIG. 15A

| Conversion Ratio | Phase | A1 | A2 | A3 | B1 | B2 | B3 | C1 | C2 | C3 | D1 | D2 | D3 | E1 | E2 | E3 | F1 | F2 | G1 | G2 |
|---|---|---|---|---|---|---|---|---|---|---|---|---|---|---|---|---|---|---|---|---|
| 8/7 | 1 | 0 | 0 | 0 | 0 | 0 | 1 | 0 | 0 | 0 | 0 | 1 | 0 | 0 | 0 | 0 | 1 | 0 | 0 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 0 | 1 | 0 | 0 | 0 | 0 | 0 | 0 | 0 | 1 | 0 | 0 | 1 | 0 | 0 | 0 |
|  | 4 | 0 | 0 | 0 | 1 | 0 | 0 | 0 | 1 | 0 | 0 | 0 | 0 | 0 | 0 | 0 | 0 | 0 | 1 | 0 |
| 7/6 | 1 | 0 | 0 | 1 | 0 | 0 | 0 | 0 | 0 | 0 | 1 | 1 | 0 | 0 | 0 | 0 | 1 | 0 | 0 | 1 |
|  | 2 | 0 | 0 | 0 | 0 | 0 | 0 | 0 | 0 | 0 | 0 | 1 | 1 | 0 | 0 | 0 | 0 | 1 | 1 | 0 |
|  | 3 | 0 | 0 | 0 | 1 | 0 | 0 | 0 | 0 | 1 | 0 | 0 | 0 | 0 | 0 | 0 | 0 | 0 | 1 | 1 |
| 6/5 | 1 | 0 | 0 | 0 | 0 | 0 | 1 | 0 | 0 | 0 | 0 | 0 | 0 | 1 | 0 | 0 | 1 | 0 | 0 | 0 |
|  | 2 | 0 | 0 | 0 | 1 | 0 | 0 | 0 | 1 | 0 | 0 | 0 | 0 | 0 | 0 | 0 | 0 | 0 | 1 | 0 |
|  | 3 | 1 | 0 | 1 | 0 | 0 | 0 | 0 | 0 | 0 | 1 | 1 | 0 | 0 | 0 | 0 | 0 | 0 | 0 | 1 |
| 5/4 | 1 | 0 | 0 | 0 | 0 | 1 | 1 | 0 | 0 | 1 | 1 | 0 | 0 | 0 | 0 | 0 | 0 | 1 | 0 | 0 |
|  | 2 | 0 | 0 | 1 | 1 | 0 | 0 | 1 | 0 | 0 | 0 | 0 | 0 | 1 | 0 | 0 | 0 | 0 | 0 | 1 |
| 7/5 | 1 | 0 | 0 | 0 | 0 | 0 | 1 | 0 | 0 | 0 | 1 | 1 | 0 | 0 | 0 | 0 | 1 | 1 | 0 | 0 |
|  | 2 | 0 | 0 | 1 | 0 | 0 | 0 | 0 | 0 | 0 | 0 | 0 | 0 | 1 | 0 | 0 | 0 | 0 | 1 | 1 |
|  | 3 | 0 | 0 | 0 | 1 | 0 | 0 | 0 | 1 | 0 | 0 | 0 | 0 | 0 | 0 | 0 | 0 | 0 | 1 | 0 |
| 8/5 | 1 | 0 | 0 | 0 | 0 | 0 | 1 | 0 | 0 | 0 | 0 | 1 | 0 | 0 | 0 | 0 | 0 | 1 | 0 | 0 |
|  | 2 | 0 | 0 | 1 | 0 | 0 | 0 | 0 | 0 | 0 | 0 | 0 | 0 | 1 | 0 | 0 | 0 | 0 | 1 | 1 |
|  | 3 | 0 | 0 | 0 | 0 | 0 | 0 | 0 | 0 | 0 | 0 | 1 | 0 | 1 | 0 | 0 | 1 | 0 | 0 | 0 |
|  | 4 | 0 | 0 | 0 | 1 | 0 | 0 | 0 | 0 | 0 | 0 | 0 | 1 | 0 | 0 | 0 | 0 | 1 | 1 | 0 |
| 5/3 | 1 | 0 | 0 | 0 | 1 | 0 | 0 | 0 | 0 | 1 | 0 | 0 | 0 | 0 | 1 | 0 | 1 | 0 | 0 | 1 |
|  | 2 | 1 | 0 | 0 | 0 | 0 | 0 | 0 | 0 | 0 | 1 | 0 | 0 | 0 | 0 | 1 | 0 | 1 | 1 | 0 |
| 7/4 | 1 | 0 | 0 | 1 | 0 | 0 | 0 | 0 | 0 | 0 | 0 | 0 | 0 | 1 | 0 | 0 | 0 | 0 | 1 | 1 |
|  | 2 | 0 | 0 | 0 | 0 | 1 | 0 | 0 | 0 | 0 | 0 | 0 | 0 | 1 | 0 | 0 | 1 | 0 | 0 | 0 |
|  | 3 | 0 | 0 | 0 | 1 | 0 | 1 | 1 | 0 | 0 | 0 | 1 | 0 | 0 | 0 | 0 | 0 | 1 | 0 | 0 |
| 7/3 | 1 | 0 | 0 | 0 | 0 | 0 | 1 | 0 | 0 | 0 | 0 | 0 | 0 | 1 | 0 | 0 | 0 | 1 | 1 | 0 |
|  | 2 | 0 | 0 | 0 | 0 | 1 | 0 | 0 | 0 | 0 | 0 | 0 | 0 | 1 | 0 | 1 | 0 | 0 | 0 | 0 |
|  | 3 | 0 | 0 | 1 | 1 | 0 | 0 | 1 | 0 | 0 | 0 | 0 | 0 | 0 | 1 | 0 | 0 | 0 | 0 | 0 |
| 5/2 | 1 | 0 | 0 | 1 | 0 | 1 | 0 | 0 | 0 | 0 | 0 | 0 | 0 | 1 | 0 | 0 | 1 | 0 | 0 | 1 |
|  | 2 | 0 | 0 | 0 | 1 | 0 | 1 | 1 | 0 | 0 | 0 | 0 | 0 | 1 | 0 | 0 | 1 | 0 | 0 | 0 |
| 8/3 | 1 | 0 | 0 | 0 | 0 | 0 | 1 | 0 | 0 | 0 | 1 | 0 | 0 | 0 | 0 | 0 | 0 | 1 | 0 | 0 |
|  | 2 | 0 | 0 | 1 | 0 | 0 | 0 | 0 | 0 | 0 | 1 | 0 | 0 | 0 | 0 | 0 | 0 | 0 | 1 | 1 |
|  | 3 | 0 | 0 | 0 | 0 | 0 | 0 | 0 | 0 | 0 | 0 | 1 | 0 | 1 | 0 | 0 | 1 | 0 | 0 | 0 |
|  | 4 | 0 | 0 | 0 | 1 | 0 | 0 | 0 | 0 | 0 | 0 | 0 | 1 | 0 | 0 | 0 | 1 | 0 | 1 | 0 |
| 7/2 | 1 | 0 | 0 | 0 | 1 | 0 | 0 | 0 | 0 | 0 | 0 | 0 | 1 | 0 | 0 | 0 | 0 | 1 | 1 | 0 |
|  | 2 | 0 | 0 | 0 | 1 | 0 | 0 | 0 | 0 | 0 | 0 | 0 | 0 | 1 | 0 | 1 | 0 | 0 | 0 | 0 |
|  | 3 | 1 | 0 | 0 | 0 | 0 | 0 | 0 | 0 | 1 | 0 | 0 | 0 | 1 | 0 | 0 | 0 | 0 | 1 | 1 |
| 5 | 1 | 0 | 0 | 0 | 0 | 1 | 0 | 0 | 0 | 0 | 0 | 0 | 0 | 1 | 0 | 1 | 0 | 1 | 1 | 0 |
|  | 2 | 0 | 0 | 0 | 1 | 0 | 0 | 0 | 1 | 0 | 0 | 0 | 0 | 1 | 0 | 1 | 0 | 0 | 0 | 1 |
| 6 | 1 | 0 | 0 | 0 | 0 | 1 | 0 | 0 | 0 | 1 | 0 | 0 | 0 | 0 | 0 | 0 | 0 | 0 | 0 | 1 |
|  | 2 | 0 | 0 | 0 | 1 | 0 | 0 | 0 | 0 | 0 | 0 | 0 | 0 | 1 | 0 | 1 | 0 | 0 | 0 | 0 |
|  | 3 | 1 | 0 | 0 | 0 | 0 | 0 | 0 | 0 | 0 | 0 | 0 | 0 | 1 | 0 | 1 | 0 | 1 | 1 | 0 |
| 7 | 1 | 0 | 0 | 0 | 1 | 0 | 0 | 0 | 0 | 0 | 0 | 0 | 0 | 0 | 0 | 1 | 0 | 1 | 1 | 1 |
|  | 2 | 0 | 0 | 0 | 1 | 0 | 0 | 0 | 0 | 0 | 0 | 0 | 0 | 1 | 0 | 1 | 0 | 0 | 0 | 0 |
|  | 3 | 1 | 0 | 0 | 0 | 0 | 0 | 0 | 1 | 0 | 0 | 0 | 1 | 0 | 0 | 0 | 0 | 0 | 1 | 1 |
| 8 | 1 | 0 | 1 | 0 | 0 | 0 | 0 | 0 | 0 | 0 | 0 | 0 | 0 | 1 | 0 | 0 | 0 | 0 | 0 | 0 |
|  | 2 | 0 | 0 | 0 | 0 | 1 | 0 | 0 | 0 | 0 | 0 | 0 | 1 | 0 | 0 | 1 | 0 | 0 | 0 | 0 |
|  | 3 | 0 | 0 | 0 | 1 | 0 | 0 | 0 | 0 | 1 | 0 | 0 | 0 | 0 | 0 | 0 | 0 | 0 | 1 | 1 |
|  | 4 | 0 | 0 | 0 | 1 | 0 | 0 | 0 | 0 | 0 | 0 | 0 | 0 | 0 | 0 | 1 | 0 | 1 | 1 | 0 |

FIG. 15B

| Parameter | Minimum | Typical | Maximum | Unit |
|---|---|---|---|---|
| Input Voltage | 2.6 | | 5.5 | V |
| Output Voltage | | 3.3 | | V |
| Output Current | 0 | | 165 | mA |
| Switching Frequency | | | 1 | MHz |
| Number of Floating Capacitors | | 2 | | |
| Floating Capacitance | | 1 | | µF |
| Input Capacitance | | 10 | | µF |
| Output Capacitance | | 10 | | µF |

FIG. 16

OPTIMIZED, MULTIPHASE SWITCHED-CAPACITOR DC-DC CONVERTER WITH VARIABLE GAIN

FIELD OF THE INVENTION

The present invention relates to DC-DC converters, and in particular to an optimized, high efficiency switched-capacitor DC-DC converter.

BACKGROUND

Switched-capacitor (SC) DC-DC converters are a category of DC-DC converters which are comprised of capacitors and switches and contain no magnetic elements, such as inductors and transformers. As a result, switched-capacitor converters are particularly well-suited for monolithic integration and are most commonly used in low-power applications.

Unlike traditional, magnetics-based DC-DC converters, the ideal, unloaded conversion ratio, $M_i$, of a switched-capacitor DC-DC converter is entirely determined by its structure. For a given topology, the output voltage is unable to exceed the ideal value $V_{out} = M_i \cdot V_{in}$. The maximum attainable efficiency of all SC converters depends on this ideal conversion ratio and is given as $$\eta_{max} = \frac{1}{M_i} \cdot \frac{V_{out}}{V_{in}}. \quad (1)$$

It is apparent from (1) that the efficiency is highest when the converter is operating close to the ideal value, i.e., $V_{out} = M_i \cdot V_{in}$. Thus, SC converters are most effective in applications where the line does not vary significantly. It is also evident that the only way to extend the input voltage range and fundamentally improve the efficiency of switched-capacitor DC-DC converters is by utilizing a variable, multi-gain SC converter configuration.

The attainable ideal conversion ratios of a two-phase switched-capacitor DC-DC converter are known and can be expressed as $$M_i = \frac{A[N]}{B[N]} \quad (2)$$

where A[N] and B[N], are integer values that are bounded by the number of floating capacitors N. These boundaries are given as $$1 \leq P[N], Q[N] \leq F_{N+1} \quad (3)$$

where $F_N$ is the N-th Fibonacci number. The Fibonacci numbers follow the sequence $$F_{N+1} = F_N + F_{N-1} \quad (4)$$

where $F_1 = 1$ and $F_0 = 1$.

Thus, with an increased number of capacitors, an SC converter is capable of attaining an increased number of ideal conversion ratios. Nevertheless, there is a strong motivation to limit the number of capacitors in a SC converter. While a large number of active devices can be integrated in a small area using modern CMOS processes, current integrated capacitors typically achieve densities of 0.1-10 $nF/mm^2$. This low capacitive density significantly increases the size of the converter and thus its cost. In addition, integrated capacitors exhibit high parasitic bottom-plate capacitances, degrading the efficiency and performance.

A variety of switched-capacitor DC-DC converters have been proposed. These include those found in U.S. Pat. No. 5,414,614 issued to Motorola on May 9, 1995, U.S. Pat. No. 6,198,645 issued to National Semiconductor Corporation on Mar. 6, 2001, U.S. Pat. No. 8,259,476 issued to Ben-Yaakov et al on Jul. 29, 2009, U.S. Pat. No. 8,817,501 issued to Arctic Sand Technologies Inc. on Aug. 26, 2014, and U.S. Pat. No. 9,362,818 issued to Rf Micro Devices Inc. on Jun. 7, 2016. These prior converters, however, can generate only a limited number of ideal conversion ratios. In some cases, these converters cannot both step-up and step-down input voltage and, in other cases, use an excessively higher number of capacitors and switching states than are required.

SUMMARY

According to aspects of the present invention, a structure and method is provided for DC to DC conversion using switched-capacitors. The converter, having an input connected to an energy source and an output connected to a load, is comprised of a plurality of capacitors and a plurality of switches which are arranged in a manner to maximize the number of attainable ideal conversion ratios.

A method is provided for controlling the converter, where the switches are turned on and off, such that the converter cycles through a plurality of topological configurations, where the number of topological configurations is at least two. A set of sample switching sequences are provided to generate any positive attainable ideal conversion ratio, for up to three floating capacitors.

The converter is thus capable of varying its ideal conversion gain and can be used to step-up or step-down the input voltage. This design allows the efficiency of switched-capacitor converters to approach their theoretical limits.

The converter is composed of one or more modules, with each module corresponding to a single floating capacitor in the circuit. In some embodiments, where more ideal conversion ratios are required, more modules, and thus more floating capacitors, can be used.

The switches and capacitors of the converter constitute a dynamic, programmable array. In some embodiments, the number of switches can be reduced to eliminate switches which are not required to generate a specified ideal conversion ratio(s).

A more complete appreciation of the present invention and its improvements can be obtained by reference to the accompanying drawings, which are briefly summarized below, to the following detailed description of the invention, and to the appended claims.

BRIEF DESCRIPTION OF DRAWINGS

To better understand the invention, and to show more clearly how it may be carried into effect, embodiments will be described, by way of example, with reference to the accompanying drawings, wherein:

FIG. 11 is a table which lists a sample switching sequence for each attainable ideal conversion ratio for the converter in FIG. 10;

FIGS. 13A and 13B are tables which list a sample switching sequence for a set of attainable step-down and step-up ideal conversion ratios for the converter in FIG. 12;

FIG. 14 is a table which lists an alternate set of switching sequences corresponding to the attainable ideal conversion ratios for the converter in FIG. 10;

FIGS. 15A and 15B are tables which list an alternate switching sequences corresponding to a set of attainable step-down and step-up ideal conversion ratios for the converter in FIG. 12;

FIG. 16 is a table which lists the specifications for an embodiment of the converter of the present invention;

DETAILED DESCRIPTION OF EMBODIMENTS

Figure 1:
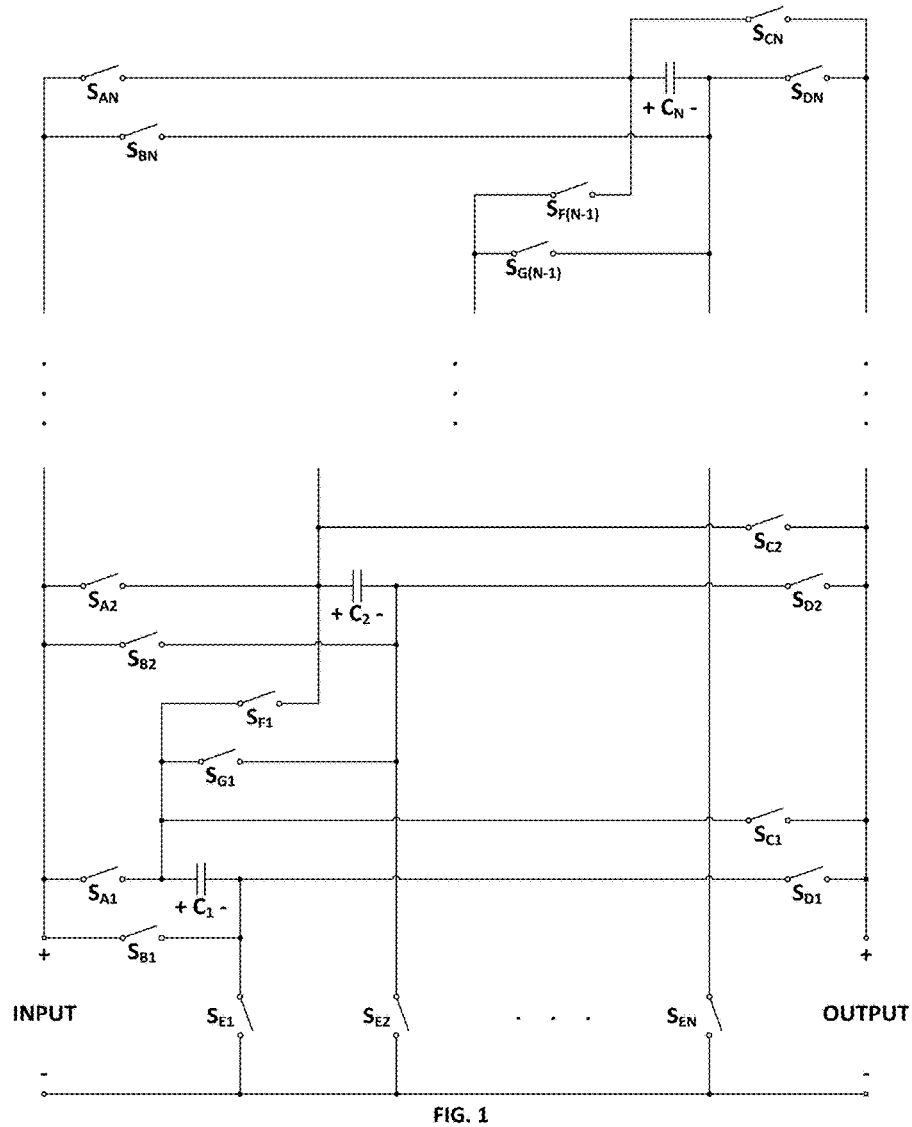
FIG. 1 is an embodiment of the generalized structure of the optimized, variable-gain switched-capacitor DC-DC converter of the present invention.

The generalized structure of one embodiment of the switched-capacitor DC-DC converter of the present invention is depicted in FIG. 1. The converter has an input with a positive terminal and negative terminal, connected to an energy source, and an output with a positive terminal and negative terminal, connected to a load. The input and output terminals of the converter are both typically connected to at least one input capacitor and at least one output capacitor. The converter is comprised of N floating capacitors and S switches. The number of switches in the converter depends on the number of floating capacitors and is given as S=7N−2 for the embodiment in FIG. 1.

Figure 2A:
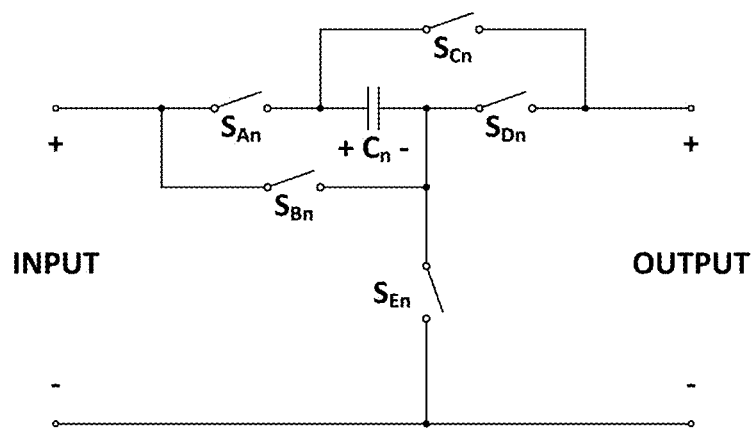
FIGS. 2A and 2B are embodiments of the generalized structure of a single module corresponding to the switched-capacitor DC-DC converter of the present invention.

The converter of the present invention is modular with each module corresponding to a floating capacitor in the circuit. The generalized structure of a module corresponding to the switched-capacitor DC-DC converter of the present invention is depicted in FIG. 2A. Each module is comprised of a floating capacitor and five switches, which connect the floating capacitor to the input and output terminals of the converter. Switch $S_{An}$ connects the positive terminal, or top plate, of capacitor $C_n$ to the positive terminal of the input. Switch $S_{Bn}$ connects the negative terminal, or bottom plate, of capacitor $C_n$ to the positive terminal of the input. Switch $S_{Cn}$ connects the positive terminal, or top plate, of capacitor $C_n$ to the positive terminal of the output. Switch $S_{Dn}$ connects the negative terminal, or bottom plate, of capacitor $C_n$ to the positive terminal of the output. Switch $S_{En}$ connects the negative terminal, or bottom plate, of capacitor $C_n$ to the negative terminal of the input and the negative terminal of the output.

Figure 2B:
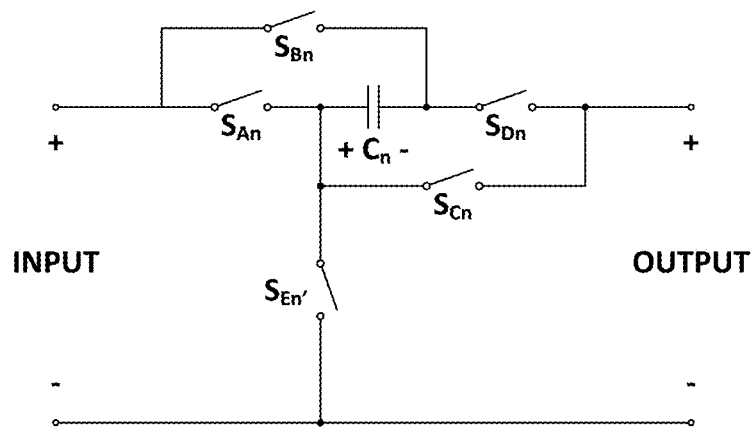

The generalized structure of another embodiment of a module corresponding to the switched-capacitor DC-DC converter of the present invention is shown in FIG. 2B. In this embodiment, switch $S_{En'}$ connects the positive terminal, or top plate, of capacitor $C_n$ to the negative terminal of the input and the negative terminal of the output. The remaining switches are configured in the same way as the previously described module, shown in FIG. 2A.

Figure 3:
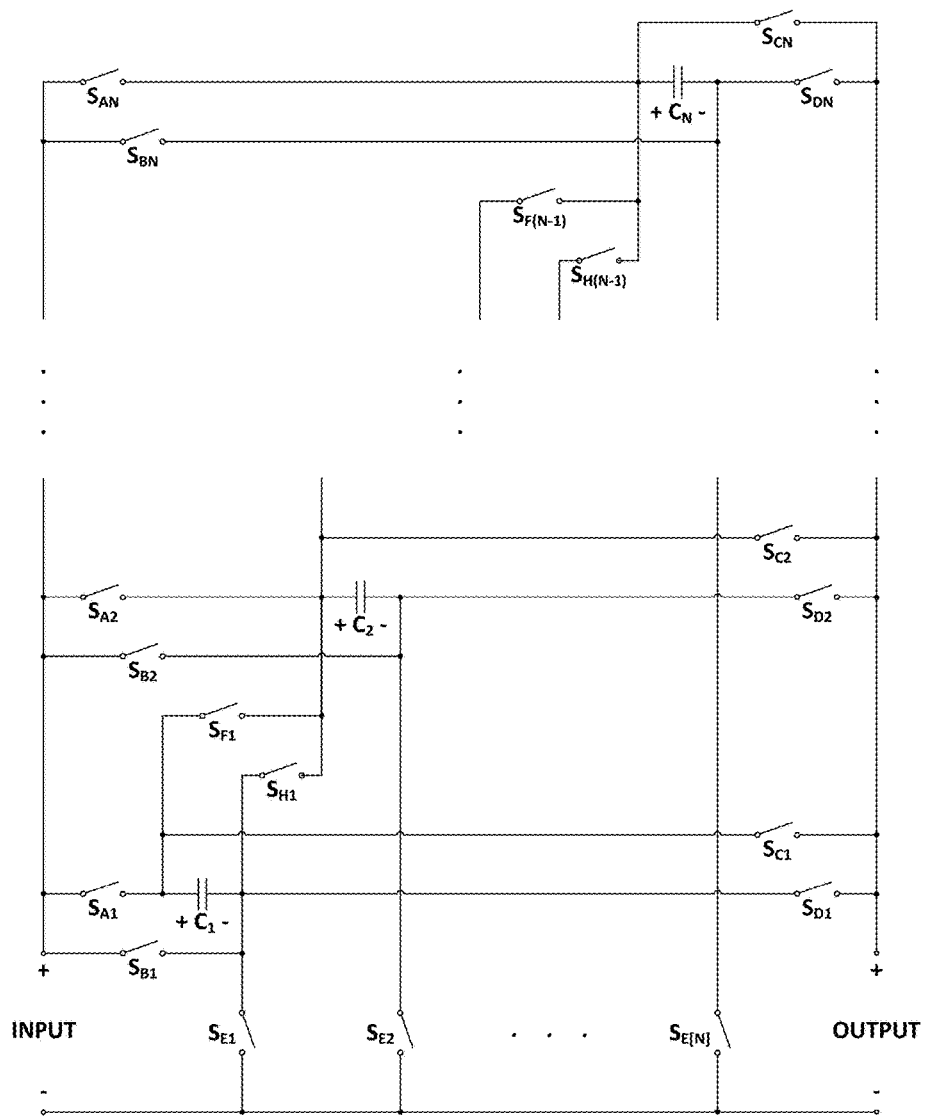
FIG. 3 is another embodiment of the generalized structure of the optimized, variable-gain switched-capacitor DC-DC converter of the present invention.

Each module, and its floating capacitor, is connected to the adjacent module, and its floating capacitor, using two switches. For the generalized converter of the present invention shown in FIG. 1, which is comprised of N modules shown in FIG. 2A, switch $S_{Fn}$ connects the positive terminal, or top plate, of capacitor $C_n$ to the positive terminal, or top plate, of capacitor $C_{n+1}$ and switch $S_{Gn}$ connects the positive terminal, or top plate, of capacitor $C_n$ to the negative terminal, or bottom plate, of capacitor $C_{n+1}$. This configuration is depicted for the converter of the present invention shown in FIG. 1. In yet another embodiment, switch $S_{Gn}$ is replaced with switch $S_{Hn}$, which connects the negative terminal, or bottom plate, of capacitor $C_n$ to the positive terminal, or top plate, of capacitor $C_{n+1}$. This configuration is depicted for the converter of the present invention shown in FIG. 3.

For the generalized converter of the present invention, which is comprised of N modules shown in FIG. 2B, switch $S_{Fn'}$ connects the negative terminal, or bottom plate, of capacitor $C_n$ to the negative terminal, or bottom plate, of capacitor $C_{n+1}$ and switch $S_{Gn'}$ connects the negative terminal, or bottom plate, of capacitor $C_n$ to the positive terminal, or top plate, of capacitor $C_{n+1}$. In yet another embodiment, switch $S_{Gn'}$ is replaced with switch $S_{Hn'}$, which connects the positive terminal, or top plate, of capacitor $C_n$ to the negative terminal, or bottom plate, of capacitor $C_{n+1}$.

Figure 4:
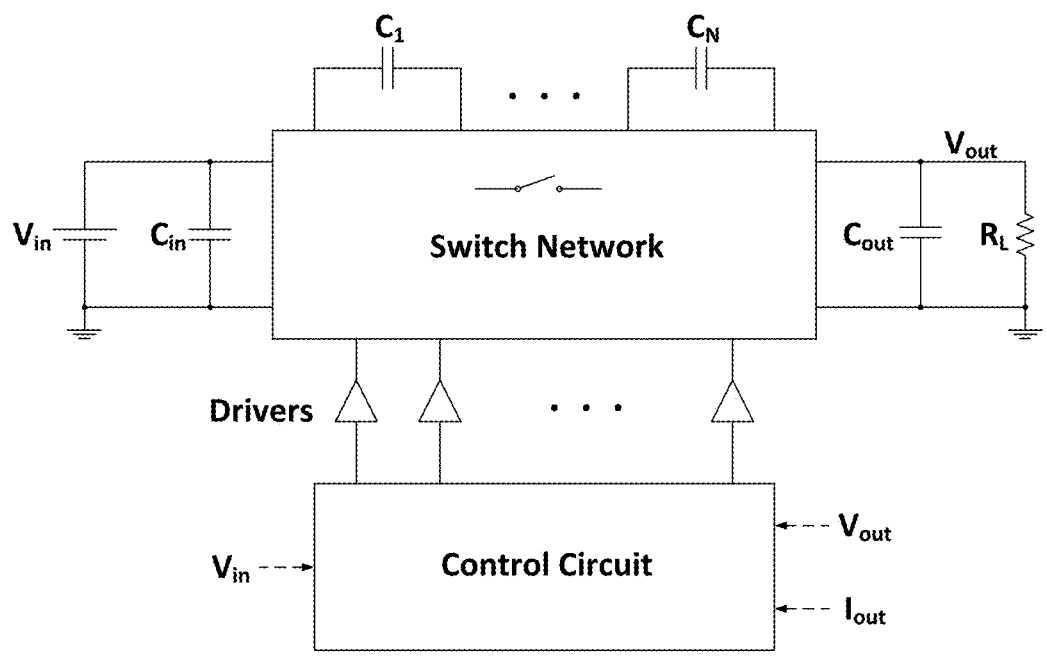
FIG. 4 is a system-level block diagram of the converter.

A system level block diagram of the converter is shown in FIG. 4. The control circuitry turns the switches on and off in such a manner that the converter cycles through P distinct topological configurations, or phases, where P≥2.

By operating the converter in a multiphase manner, the converter is capable of generating an increased number of positive, ideal conversion ratios for the given number of capacitors. An attainable set of ideal conversion ratio of the switched-capacitor DC-DC converter can be expressed as $$M_i = \frac{A[N, P]}{B[N, P]} \quad (5)$$

where A[N, P] and B[N, P] are integer values that are bounded by the number of floating capacitors, N, and number of phases, P. These boundaries are given as $$1 \leq A[N,P], B[N,P] \leq F_{N+1,P}. \quad (6)$$

The generalized Fibonacci number, $F_{N+1,P}$, is a function of the two variables, N and P, and is defined as $$F_{N+1,P} \triangleq \sum_{i=0}^{P-1} F_{N-i,P} \quad (7)$$

where $F_{0,P}=1$ and $F_{k,P}=0$ for k<0. Thus, each number in the generalized Fibonacci $F_{k,P}$ sequence is the sum of the P preceding numbers. The expression in (7) can be evaluated for different values of N and P. These results are summarized in FIG. 5 for N≤4 and P≤5.

When the number of phases is P=N+1, the generalized Fibonacci number reaches its upper limit and is equal to $2^N$. When the number of phases is equal to two, the generalized Fibonacci number sequence in (7) is the same as the traditional Fibonacci number sequence in (4). The number of attainable conversion ratios is increased with an increased number of capacitors.

Figures 5, 6:
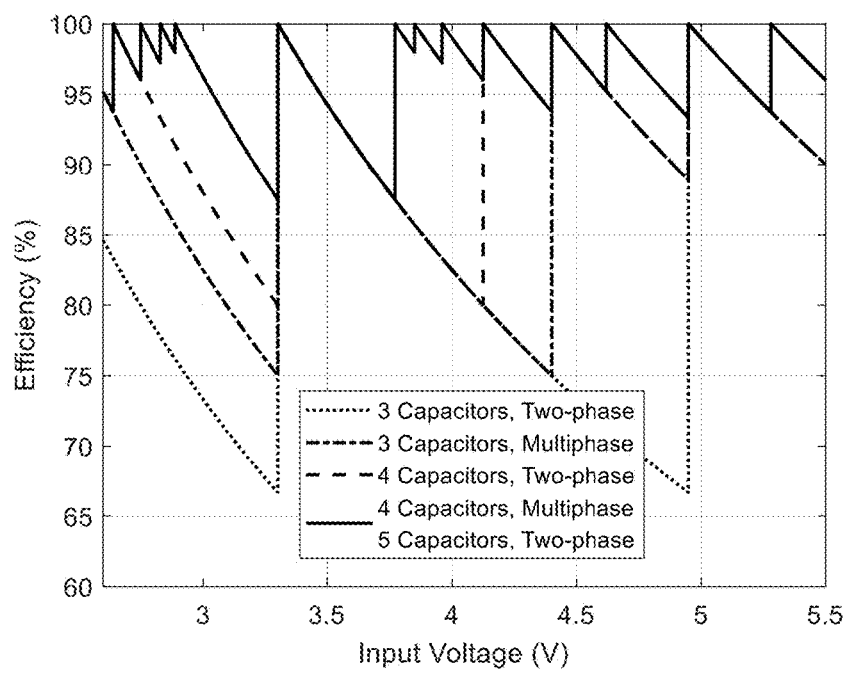
FIG. 5 is a table which lists the generalized Fibonacci number, $F_{N+1,P}$, for different values of N and P.
FIG. 6 illustrates the theoretical efficiency of a switched-capacitor DC-DC converter based on the number of floating capacitors when $V_{out}$=3.3 V.

From FIG. 5, it is also evident that the number of attainable conversion ratios is significantly increased through multiphase operation. An illustration showing the theoretical efficiency improvements, according to (1), that could occur from the use of a multiphase control strategy, based on the attainable set of ideal conversion ratios defined by (5)-(7), is shown in FIG. 6 for $V_{in}$=2.6-5.5 V and $V_{out}$=3.3 V. For the embodiment using two floating capacitors in FIG. 6, the average theoretical efficiency when using a multiphase control strategy is 88.9%, approximately 6.7% higher than when using a two-phase control strategy. For the embodiment utilizing three floating capacitors, the average theoretical efficiency with multiphase operation is 96.2%, approximately 4.2% higher than with two-phase operation. The same average efficiency can be obtained using three capacitors and multiphase operation as can be achieved using four capacitors and two-phase operation.

Figures 7, 8:
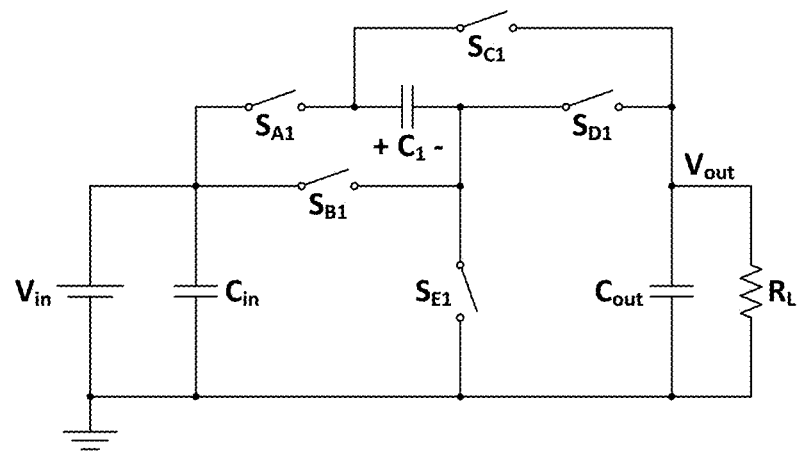
FIG. 7 is a circuit diagram of an embodiment of the switched-capacitor DC-DC converter of the present invention utilizing one floating capacitor.
FIG. 8 is a table which lists the switching sequences for each attainable ideal conversion ratio for the converter in FIG. 7.

The switched-capacitor DC-DC converter of the present invention, utilizing one floating capacitor and five switches, which is equivalent to a single module, is shown in FIG. 7. The attainable conversion ratios of the converter can be enumerated according to their corresponding switching sequence. The switching sequence defines which switches need to be turned on for each phase to generate the specified conversion ratio. The results are summarized in FIG. 8, where '1' indicates that the switch is closed for that phase while '0' indicates that the switch is open.

Figure 9A:
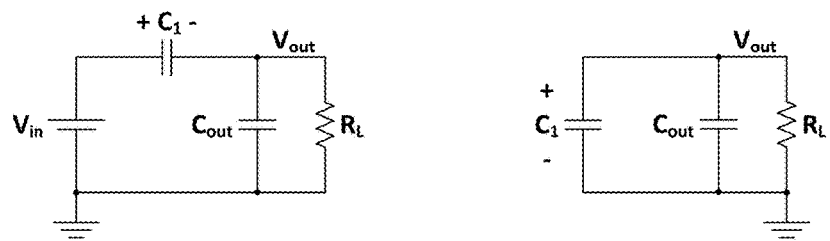
FIG. 9A through 9D show the switching states corresponding to the converter in FIG. 7 for the various attainable ideal conversion ratios listed in FIG. 8.
Figure 9B:
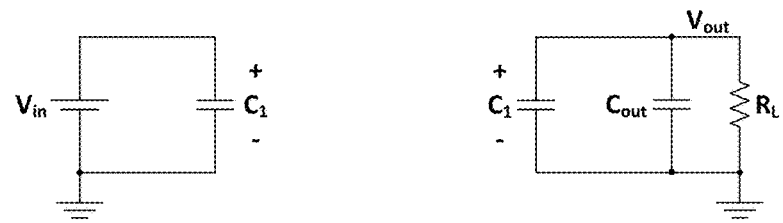
Figure 9C:
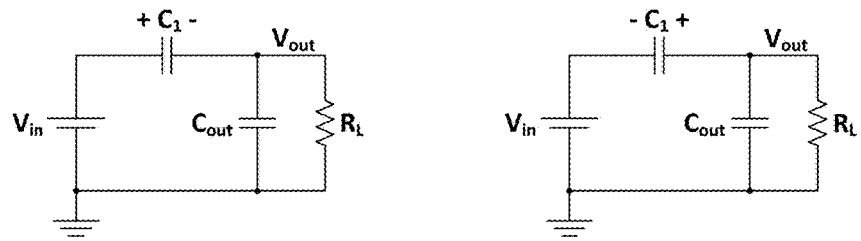
Figure 9D:
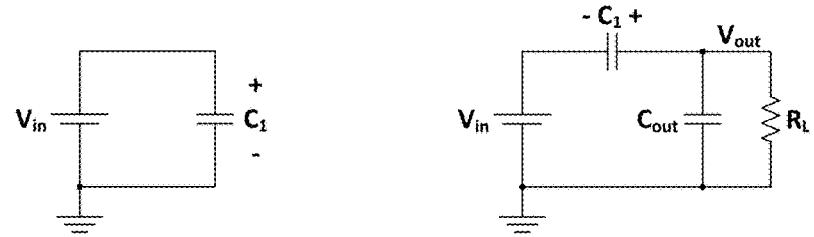

The switching networks corresponding to the table in FIG. 8 and the SC DC-DC converter in FIG. 7 are summarized in FIG. 9A through 9D. FIG. 9A depicts the switching network for the ideal conversion ratio $M_i=\frac{1}{2}$, FIG. 9B for the conversion ratio $M_i=1$, FIG. 9C for $M_i=1$ (alternative), and FIG. 9D for $M_i=2$.

A specific conversion ratio can often be obtained using more than one switching sequence. This is evident with conversion ratio 1, where two switching sequences are presented in FIG. 8. One switching sequence has a switch, $S_{E1}$, which is driven at a 100% duty ratio. This is not the case for the alternative switching sequence presented. Therefore, certain switching sequences, corresponding to specific embodiments of the present invention, may be considered preferable for a specific application due to their utilization of switches and ability to be practically implemented.

A set of positive ideal conversion ratios for the different versions of the converter, up to and including three floating capacitors, are enumerated with a sample switching sequence. In the interest of conciseness, only the ratios unique to that structure are listed. In addition, the converter is also capable of attaining negative conversion ratios although these will not be enumerated.

Figure 10:
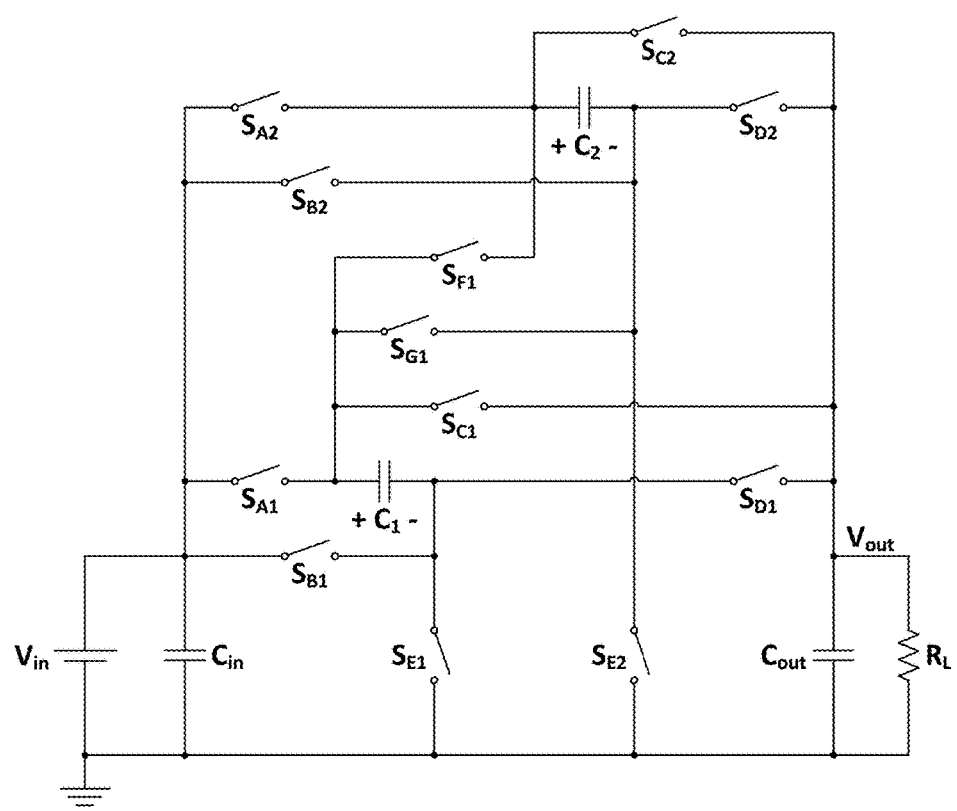
FIG. 10 is a circuit diagram of an embodiment of the switched-capacitor DC-DC converter of the present invention utilizing two floating capacitors.

An embodiment of the switched-capacitor DC-DC converter of the present invention, utilizing two floating capacitors and twelve switches, is shown in FIG. 10. The attainable conversion ratios are enumerated according to a sample switching sequence in FIG. 11.

Figure 12:
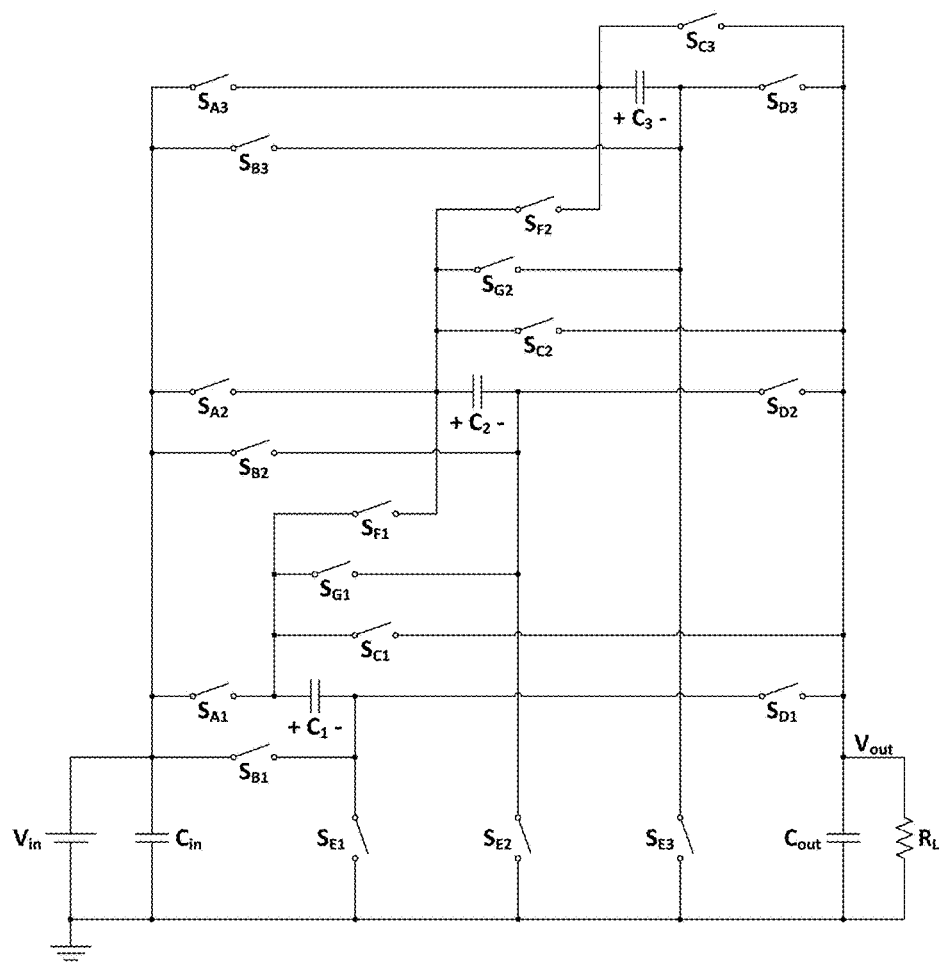
FIG. 12 is a circuit diagram of an embodiment of the switched-capacitor DC-DC converter of the present invention utilizing three floating capacitors.

An embodiment of the switched-capacitor DC-DC converter of the present invention, utilizing three floating capacitors and nineteen switches is shown in FIG. 12 while a set of attainable conversion ratios are enumerated according to a sample switching sequence in FIG. 13A and FIG. 13B for the step-up and step-down conversion ratios respectively.

When more ideal conversion ratios are required, higher-order versions of the converter, using more floating capacitors, which are also embodiments of the present invention, can be used.

Although only one switching sequence has been presented for each conversion ratio, all conversion ratios listed in FIGS. 11 and 12 can be obtained using more than one switching sequence. A set of alternative switching sequences are shown in FIGS. 14 and 15. The conversion ratios in FIG. 14 correspond to the converter in FIG. 10, while the ratios in FIG. 15 correspond to the converter in FIG. 12.

It is understood that the invention is not limited in its application to the ideal conversion ratios and switching sequences enumerated in these tables. The invention is capable of other embodiments or of being practiced and carried out in various ways.

The conversion ratios depicted in said tables and by (5)-(7) are considered ideal and it is understood by those skilled in the art, that the actual conversion ratio will deviate from this ratio when the circuit is loaded.

The switched-capacitor DC-DC converter of the present invention can dynamically vary its ideal conversion ratio by adjusting the switching sequence, i.e., which switches are turned on for each phase. The control circuit, depicted in FIG. 4, can be configured to sense the input voltage and/or output voltage and select the optimum attainable ideal conversion ratio, and its corresponding switching sequence, in order to maximize the efficiency according to (1). The optimum conversion ratio is therefore the ideal ratio closest to, but not less than, the ratio of the desired output voltage to the input voltage. The selected ideal conversion ratio, and its corresponding switching topology, must also be capable of generating the desired output voltage at the given operating conditions.

Additionally, the converter can regulate the output voltage or output current in the presence of variations in the input source and output load using feedback. The control circuit, depicted in FIG. 4, can be configured to sense the output and compare it to a desired reference value. The difference between these two values, or the error, is minimized by a controller through a control variable. The output of the converter is known to depend on the duration of each switching state (duty cycle) and the switching frequency of the converter. In some embodiments of the invention, the output can therefore by stabilized by varying the duty cycle and/or frequency of the switch gating signals.

The switched-capacitor DC-DC converter embodiments of the present invention have a number of advantages over existing SC converters. By maximizing the number of attainable, ideal conversion ratios, $M_i$, the efficiency of switched-capacitor converters can approach their theoretical limits according to (1). Thus, maximum flexibility is given to utilize the most appropriate conversion ratios for the particular application. In addition, the SC converter of the present invention is capable of maintaining high efficiency and regulation across a wide input voltage range. All of this is achieved using a minimum number of capacitors and switches, which results in reduced size, cost and switching losses, particularly for monolithic implementations.

As the proposed converter contains an increased number of positive conversion ratios, any application can be programmed into the converter for the given number of capacitors.

The converter can therefore be considered as a dynamic, programmable array of switches and capacitors. In other embodiments of the invention, switches which are not required to obtain the desired ideal conversion ratio(s) can be eliminated.

An embodiment of the converter of the present invention was implemented and simulated as a mixed-signal integrated circuit using a 0.35 μm CMOS design process. The converter utilizes two floating capacitors and produces a regulated 3.3 V output from an input varying from 2.6 V-5.5 V and is capable of stepping-up and stepping-down the voltage. The specifications for the converter are summarized in FIG. 16. The simulated results were acquired using Cadence Design System software and are based on a complete implementation of an embodiment of the present invention.

Figure 17A:
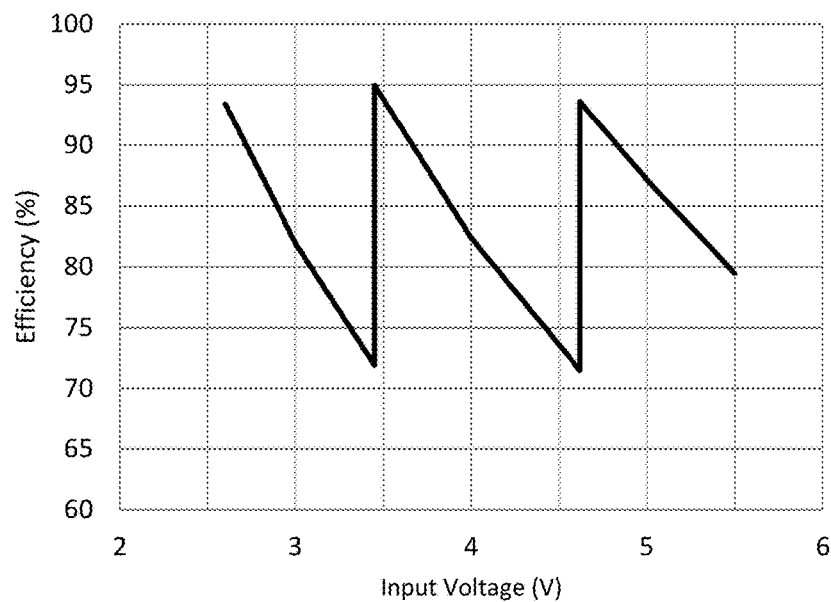
FIG. 17A shows the simulated efficiency of an embodiment of the converter as a function of the input voltage when $I_{out}$=165 mA.

The simulated efficiency of the converter as a function of the input voltage, at 165 mA of output current, is shown in FIG. 17A. The peak efficiency of the converter is 95.0% at 3.45 V input while the minimum efficiency of the converter is 71.5% at 4.62 V. The simulated efficiency is always within 2% of the ideal efficiencies, given by (1). The minor discrepancy between the ideal and measured values is primarily due to gate drive losses.

Figure 17B:
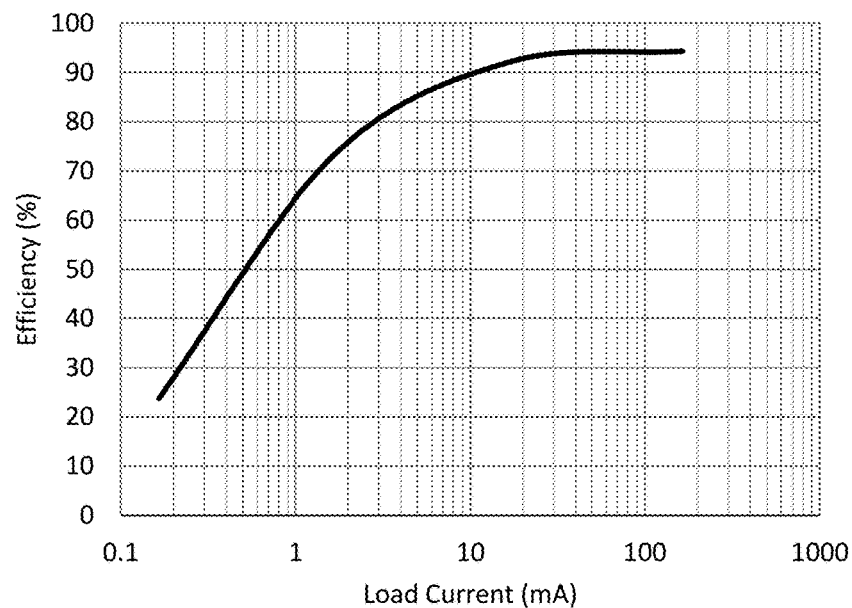
FIG. 17B shows the simulated efficiency of an embodiment of the converter as a function of the load current when $V_{in}$=3.45 V.

The simulated efficiency versus load current at an input voltage of 3.45 V is shown in FIG. 17B. The efficiency at full-load ($I_{OUT}$=165 mA) is 95.0%. The efficiency of the converter is greater than 91% at 10% of the full load and greater than 75% at 1% of the full load. Thus, the converter is capable of maintaining a high efficiency across a wide range of load current.

Figure 18A:
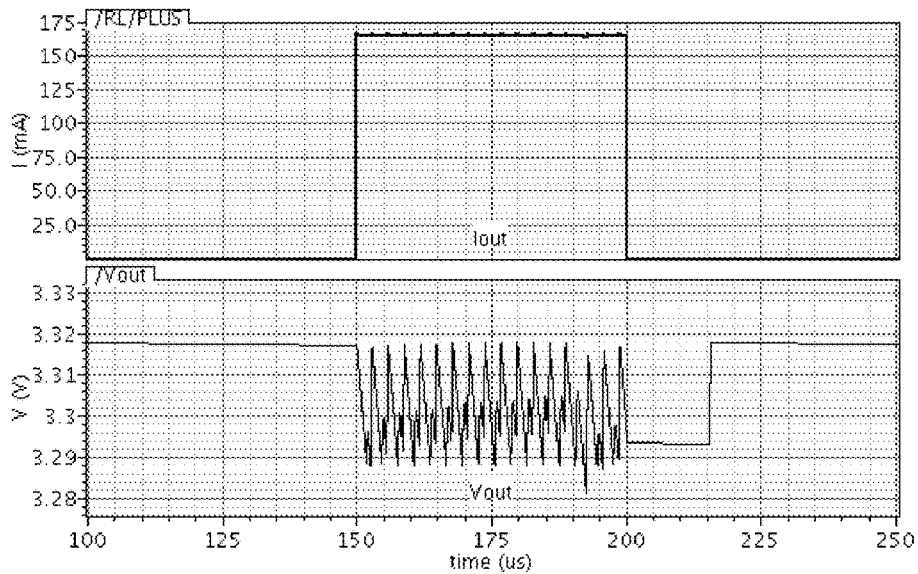
FIG. 18A shows the simulated load transient response of an embodiment of the converter as $I_{out}$ changes from 0 mA to 165 mA to 0 mA when $V_{in}$=4.6 V.

The transient response of the converter as the load current changes from no-load to full-load, 0 mA to 165 mA, is shown in FIG. 18A at an input voltage of 4.6 V. The converter responds almost instantaneously to the step response in the load, with no overshoot or undershoot visible. The output voltage ripple is less than 25 mV at full-load.

Figure 18B:
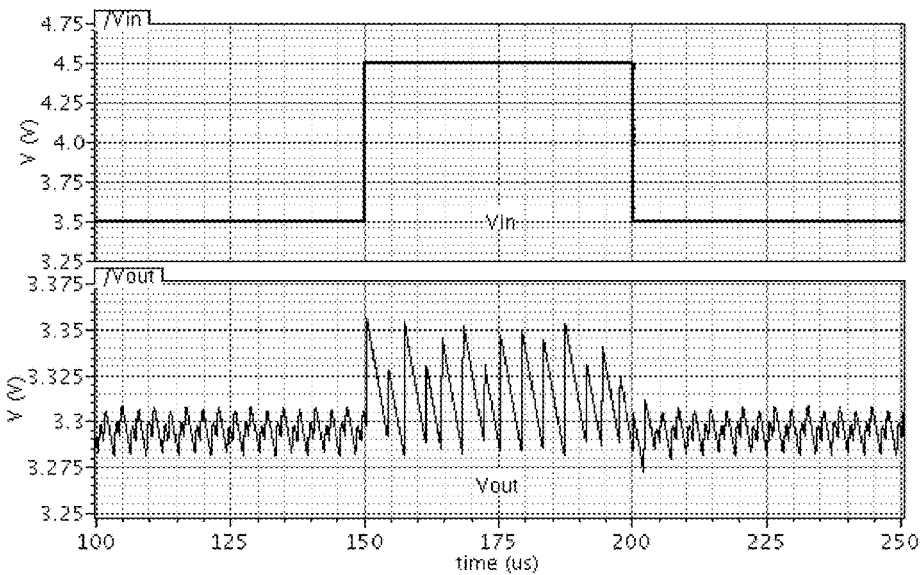
FIG. 18B shows the simulated line transient response of an embodiment of the converter as $V_{in}$ changes from 3.5 V to 4.5 V to 3.5 V when $I_{out}$=165 mA.

The transient response of the converter as the input voltage changes from 3.5 V to 4.5 V and back to 3.5 V, at 165 mA output current, is shown in FIG. 18B. The converter again responds almost instantaneously to the step response in the line, with a small overshoot visible.

Figure 19:
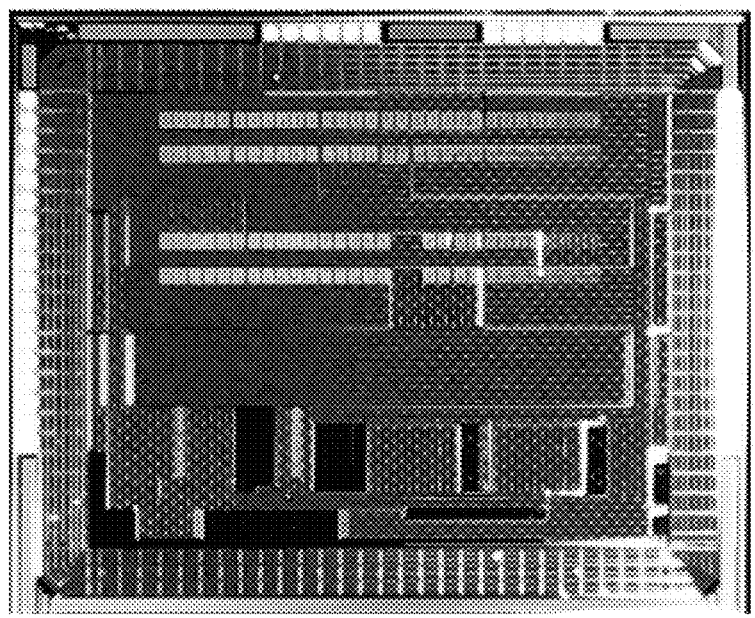
FIG. 19 is a micrograph of the silicon die of an embodiment of the converter of the present invention as an integrated circuit.

A physical embodiment of the converter of the present invention was implemented as a mixed-signal integrated circuit and fabricated using 0.35 μm CMOS design technology. A micrograph of the silicon die from this embodiment is shown in FIG. 19. The total silicon area of the die is 10.6 mm².

Figure 20:
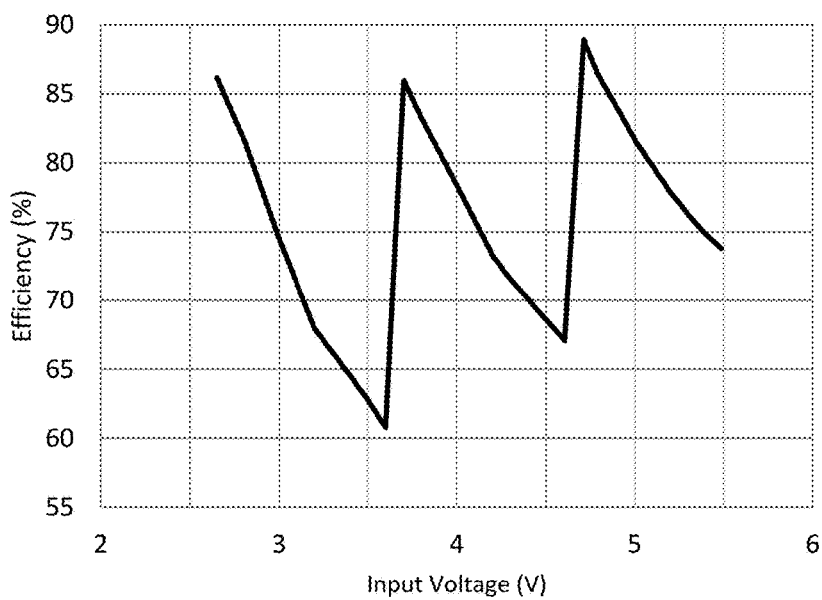
FIG. 20 shows the experimentally measured efficiency of an embodiment of the converter as a function of the input voltage when $I_{out}$=110 mA.
Figure 21:
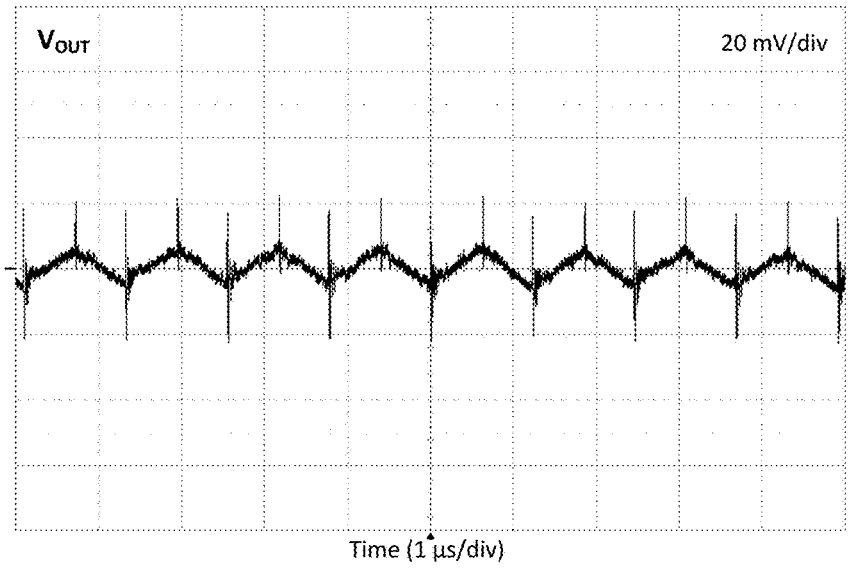
FIG. 21 shows the experimentally measured output voltage waveform of an embodiment of the converter when $V_{in}$=3.8 V and $I_{out}$=165 mA.

The experimentally measured efficiency of the converter as a function of the input voltage, at 110 mA of output current, is shown in FIG. 20. The peak efficiency of the converter is 88.9% at 4.7 V input while the minimum efficiency of the converter is 60.8% at 3.6 V.

The experimentally measured output voltage waveform of the converter, at an input voltage of 3.7 V and 165 mA of output current, is shown in FIG. 20. The ripple of the waveform is approximately 40 mV and approximately 16 mV when noise is ignored.

Figure 22:
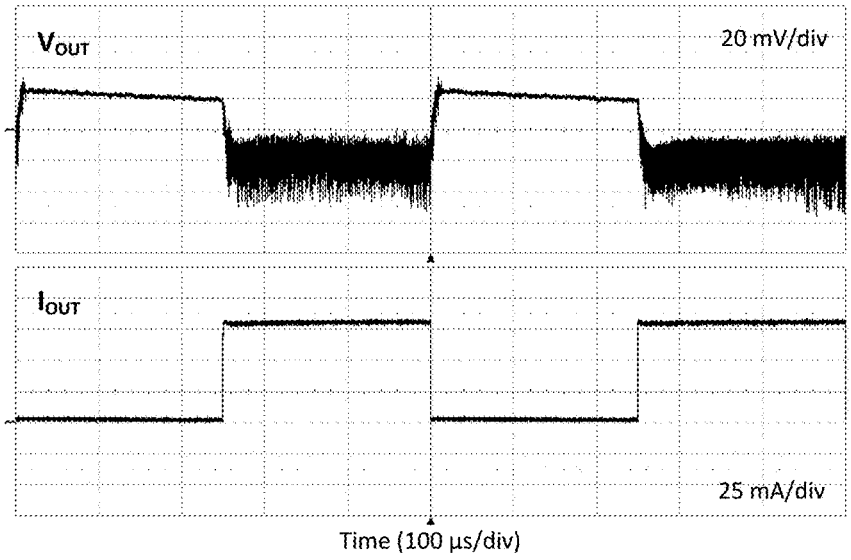
FIG. 22 shows the experimentally measured load transient response of an embodiment of the converter as $I_{out}$ changes from 0 mA to 82.5 mA to 0 mA when $V_{in}$=3.8 V.

The experimentally measured transient response of the converter as the load current changes from no-load to 82.5 mA is shown in FIG. 22, at an input voltage of 4.0 V. The converter responds almost instantaneously to the step response in the load, with minimal overshoot or undershoot visible. The output voltage ripple is less than 50 mV at 82.5 mA load current.

Although selected embodiments of the present invention have been presented and described, it is to be understood the present invention is not limited to the described embodiments. Instead, it is to be appreciated from those that are skilled in the art that changes may be made to these embodiments without departing from the principles and spirit of the invention, the scope of which is defined by the claims and the equivalents thereof.

What is claimed is:

1. A DC-DC converter comprising:
   an input, having a positive terminal and a negative terminal, and an output, having a positive terminal and a negative terminal;
   N modules comprising N capacitors, wherein N is at least two; wherein said module comprises one capacitor, having a positive terminal and a negative terminal, and a first plurality of switches comprising:
   a switch connected to the positive terminal of the capacitor and the positive terminal of the input;
   a switch connected to the negative terminal of the capacitor and the positive terminal of the input;
   a switch connected to the positive terminal of the capacitor and the positive terminal of the output;
   a switch connected to the negative terminal of the capacitor and the positive terminal of the output; and
   a switch connected to the negative terminal of the capacitor and the negative terminals of the input and output;
   an additional plurality of switches connecting the said $n^{th}$ module to the said $(n+1)^{th}$ module, wherein n is a natural number less than N; and
   a control circuit configured to open and close said first plurality of switches and said additional plurality of switches, such that the converter cycles through P topological states, wherein P is at least two.

2. The converter of claim 1 wherein the output of said converter has at least one capacitor connected across the positive and negative terminals of the output.

3. The converter of claim 1 wherein the input of said converter has at least one capacitor connected across the positive and negative terminals of the input.

4. The converter of claim 1 wherein said module is connected to an adjacent module by said additional plurality of switches comprising:
   a switch connected to the positive terminal of one capacitor and the positive terminal of an adjacent capacitor of the adjacent module; and
   a switch connected to the positive terminal of said one capacitor and the negative terminal of said adjacent capacitor of the adjacent module.

5. The converter of claim 1 wherein said capacitors of two adjacent modules are connected by two switches.

6. The converter of claim 1 wherein said control circuit is configured to generate a multiphase switching sequence used to open and close said switches in a cyclical manner, to obtain an attainable ideal conversion ratio for said converter, wherein the number of phases of the multiphase switching sequence is at least two.

7. The converter of claim 6 wherein said control circuit is configured to vary the ideal conversion ratio during operation of said converter.

8. The converter of claim 1 wherein said control circuit is configured to regulate the output at a desired output voltage or output current during operation of said converter.

9. The converter of claim 6 wherein the attainable ideal conversion ratio of said converter comprises an ideal conversion ratio specified by fraction A/B, wherein A and B are integer values that are greater than or equal to one and less than or equal to the generalized Fibonacci number, $F_{N+1,P}$.

* * * * *